(12) United States Patent
Gou et al.

(10) Patent No.: US 10,405,350 B2
(45) Date of Patent: Sep. 3, 2019

(54) UNLICENSED CARRIER CONTENTION METHOD AND APPARATUS

(71) Applicant: ZTE Corporation, Shenzhen (CN)

(72) Inventors: Wei Gou, Shenzhen (CN); Focai Peng, Shenzhen (CN); Feng Bi, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 24 days.

(21) Appl. No.: 15/564,798

(22) PCT Filed: Apr. 8, 2016

(86) PCT No.: PCT/CN2016/078903
§ 371 (c)(1),
(2) Date: Nov. 9, 2017

(87) PCT Pub. No.: WO2016/161980
PCT Pub. Date: Oct. 13, 2016

(65) Prior Publication Data
US 2018/0115995 A1    Apr. 26, 2018

(30) Foreign Application Priority Data
Apr. 10, 2015    (CN) .......................... 2015 1 0170358

(51) Int. Cl.
*H04W 24/02* (2009.01)
*H04W 74/08* (2009.01)

(52) U.S. Cl.
CPC ....... *H04W 74/0816* (2013.01); *H04W 24/02* (2013.01)

(58) Field of Classification Search
CPC ..... H04W 16/14; H04W 24/02; H04W 72/12; H04W 74/0816
See application file for complete search history.

(56) References Cited

U.S. PATENT DOCUMENTS

| 4,210,780 A | 7/1980 | Hopkins |
|---|---|---|
| 6,389,284 B1 | 5/2002 | Cook |

(Continued)

FOREIGN PATENT DOCUMENTS

| CN | 101194481 A | 6/2008 |
|---|---|---|
| CN | 101754242 A | 6/2010 |

(Continued)

OTHER PUBLICATIONS

Zte et al., "Supporting Dual Connectivity in LTE-U", 3GPP TSG RAN Meeting #65 RP-141470, Sep. 12, 2014 (Sep. 12, 2014), the whole document, 5 pgs.

(Continued)

*Primary Examiner* — Kevin C. Harper
(74) *Attorney, Agent, or Firm* — Knobbe Martens Olson & Bear LLP

(57) ABSTRACT

An unlicensed carrier contention method and apparatus are provided. The method comprises that: a Licensed Assisted Access (LAA) device implements a Clear Channel Assessment (CCA) or an Evolution Clear Channel Assessment (eCCA) on a channel; if the result of the assessment is 'idle', the LAA device decrement N and determines whether or not the decremented N is greater than 0, wherein N is a natural number; and if the result of the determination indicates that the decremented N is not greater than 0, the LAA device uses an unlicensed carrier for data transmission. The disclosure addresses the problem that no contention withdrawal mechanism or procedure suitable for an LAA system is provided in the conventional art.

8 Claims, 13 Drawing Sheets

The device performs an initial CCA on a channel, determines whether N is greater than 0 if the channel is sensed to be idle, and performs an eCCA and decrements N if N is greater than 0

(56) References Cited

U.S. PATENT DOCUMENTS

| | | |
|---|---|---|
| 7,529,533 B2 | 5/2009 | Bellantoni |
| 7,742,822 B2 | 6/2010 | Masoud |
| 7,990,944 B2 | 8/2011 | Stanwood |
| 8,126,006 B2 | 2/2012 | May |
| 2005/0088284 A1 | 4/2005 | Zai |
| 2006/0148482 A1 | 7/2006 | Mangold |
| 2007/0025379 A1 | 2/2007 | May |
| 2007/0111697 A1 | 5/2007 | Bellantoni |
| 2007/0139162 A1 | 6/2007 | Bandy |
| 2007/0176746 A1 | 8/2007 | Lee |
| 2007/0176747 A1 | 8/2007 | Yang |
| 2007/0263654 A1 | 11/2007 | Salokannel |
| 2008/0039035 A1 | 2/2008 | Posamentier |
| 2008/0136637 A1 | 6/2008 | Mehta |
| 2008/0264431 A1 | 10/2008 | Masoud |
| 2009/0067448 A1 | 3/2009 | Stanwood |
| 2009/0146791 A1 | 6/2009 | Jantunen |
| 2009/0215457 A1 | 8/2009 | Wang |
| 2010/0195601 A1 | 8/2010 | Zhang |
| 2011/0009060 A1 | 1/2011 | Hsu |
| 2011/0128895 A1 | 6/2011 | Sadek |
| 2011/0249627 A1 | 10/2011 | Stanwood |
| 2011/0310741 A1 | 12/2011 | Ko |
| 2012/0155487 A1 | 6/2012 | Du |
| 2012/0320887 A1 | 12/2012 | Chintalapudi |
| 2013/0003803 A1 | 1/2013 | Ferguson |
| 2013/0089036 A1 | 4/2013 | Cho |
| 2013/0143502 A1 | 6/2013 | Kazmi |
| 2013/0163449 A1 | 6/2013 | Flammer, III |
| 2013/0203458 A1 | 8/2013 | Charbit et al. |
| 2016/0135212 A1* | 5/2016 | Wong .................. H04W 16/14 370/329 |
| 2016/0143014 A1* | 5/2016 | Mukherjee ........ H04W 74/0816 370/330 |

FOREIGN PATENT DOCUMENTS

| | | |
|---|---|---|
| CN | 101848543 A | 9/2010 |
| CN | 102088433 A | 6/2011 |
| CN | 102523612 A | 6/2012 |
| CN | 102668412 A | 9/2012 |
| CN | 102884857 A | 1/2013 |
| CN | 102892208 A | 1/2013 |
| CN | 103069882 A | 4/2013 |
| CN | 103209421 A | 7/2013 |
| CN | 103370896 A | 10/2013 |
| CN | 103460740 A | 12/2013 |
| CN | 103517412 A | 1/2014 |
| CN | 103533552 A | 1/2014 |
| CN | 103875187 A | 6/2014 |
| CN | 104202806 A | 12/2014 |
| CN | 104333873 A | 2/2015 |
| CN | 104486013 A | 4/2015 |
| WO | 2014189912 A1 | 11/2014 |

OTHER PUBLICATIONS

International Search Report in international application No. PCT/CN2016/078903, dated Jun. 28, 2016, 3 pgs.

English Translation of the Written Opinion of the International Search Authority in international application No. PCT/CN2016/078903, dated Jun. 28, 2016, 6 pgs.

NTT DOCOMO, Inc., "Coexistence Evaluation Results on DL Only LAA with LBT Mechanism", Mar. 2015, R1-151094 3GPP TSG RAN WG1, Ad-hoc Meeting, Retrieved from the Internet: URL: http://www.3gpp.org/ftp/tsg_ran/WG1_RL1/TSGR1_AH/LTE_LAA_1503/Docs/, 8 pgs.

Broadcom Corporation, "Proposal for LAA Medium Access for Coexistence with Wifi Devices", Feb. 2015, R1-150554, 3GPP TSG-RAN WGI Meeting #80, Retrieved from the Internet: URL:http://www.3gpp.org/ftp/Meetings_3GPP_SYNC/RAN1/Docs/ [retrieved on Feb. 8, 2015], 14 pgs.

Samsung, "Potential Impact of LBT Support for LAA", Feb. 2015, R2-150444, 3GPP TSG-RAN WG2 #89, Retrieved from the Internet: URL:http://www.3gpp.org/ftp/Meetings_3GPP_SYNC/RAN2/Docs/ [retrieved on Feb. 8, 2015], 4 pgs.

Intel Corporation, "Evaluation Results for Wi-Fi DL+UL and LAA DL Only Scenarios", Mar. 2015, R1-151099, 3GPP tSG RAN WG1 Meeting Ad-hoc, Retrieved from the Internet: URL:http://www.3gpp.org/ftp/tsg_ran/WG1_RL1/TSGR1_AH/LTE_LAA_1503/Docs/, 18 pgs.

Nokia Corporation et al, "Channel Access Mechanisms According to ETSI Regulations", Oct. 2014, R1-144183, 3GPP TSG RAN WG1 Meeting #78bis, Retrieved from the Internet: URL:http://www.3gpp.org/ftp/Meetings_3GPP_SYNC/RAN1/Docs/, 6 pgs.

Ericsson, "Details of Listen-Before-Talk for LAA", Nov. 2014, R1-145193, 3GPP TSG RAN WG1 Meeting #79, Retrieved from the Internet: URL:http://www.3gpp.org/ftp/Meetings_3GPP_SYNC/RAN1/Docs/ [retrieved on Nov. 17, 2014], 8 pgs.

Supplementary European Search Report in European application No. 16776155.0, dated Feb. 21, 2018, 12 pgs.

"Further details on LBT for LAA", Feb. 18, 2015, Ericsson, 3GPP TSG-RAN WG1 Meeting #80, R1-150584, 6 pgs.

"Discussion on LBT Design for LAA", Apr. 24, 2015, ZTE, 3GPP TSG-RAN WG1 Meeting#80bis, R1-151809, 5 pgs.

\* cited by examiner

The device performs an initial CCA on a channel, determines whether N is greater than 0 if the channel is sensed to be idle, and performs an eCCA and decrements N if N is greater than 0

UNLICENSED CARRIER CONTENTION METHOD AND APPARATUS

TECHNICAL FIELD

The disclosure relates to the field of communications, and in particular to an unlicensed carrier contention method and apparatus.

BACKGROUND

Communication networks based on Long Term Evolution (LTE) are all deployed in licensed carriers. Along with the development of LTE, some enterprises have put forward 'a subject of proposals on the deployment of LTE in unlicensed carriers', for example, America's Qualcomm believes that as data services increase sharply, licensed carriers cannot bear the huge traffic brought by the rapid service increase in the future. It is considered to deploy LTE on unlicensed carriers to share the traffic in licensed carriers so as to eliminate the traffic pressure brought by the increase of services. Meanwhile, an unlicensed carrier has the following features: on one hand, the unlicensed carrier is free or low-cost because it is not needed to buy, in other words, the cost of carrier resource is zero; on the other hand, the access requirement of the unlicensed carrier is low because apart from individuals and enterprises, devices of manufactures can participate in deploying unlicensed carrier; besides, because the unlicensed carrier is sharable, in a case where a plurality of different systems work in an unlicensed carrier or different operators of the same system work in an unlicensed carrier, some resource sharing methods can be taken into consideration to improve carrier efficiency.

In conclusion, although the deployment of LTE in unlicensed carrier has obvious advantages, the deployment confronts problems, for example, multiple access technologies are required, (the multiple access technologies cross different communication standards, resulting in difficult cooperation and various network topologies), and many wireless access stations are needed (a great number of users, difficult cooperation and high cost on centralized management). Due to the use of various wireless access technologies, various wireless systems exist in an unlicensed carrier, making it difficult to coordinate the wireless systems and leading to a serious interference among the wireless systems. Therefore, the regulation on an unlicensed carrier should be supported in a case where LTE is deployed in the unlicensed carrier, and it is required in many countries that a listening-before-talking mechanism should be supported in the deployment of a system in an unlicensed carrier. Through the listening-before-talking mechanism, the interference is avoided which is caused by neighboring systems when the neighboring systems use unlicensed carriers at the same time. A contention withdrawal mechanism is further introduced, that is, the interference resulted from the synchronous use of an unlicensed carrier by neighboring transmission nodes of the same system is avoided between neighboring system stations (generally, neighboring transmission nodes of the same system).

At present, the deployment of LTE in an unlicensed carrier (that is, a Licensed Assisted Access (LAA) system) is being researched, and it is considered by many enterprises that the downlink of an LAA system will adopt a contention withdrawal mechanism to compete for a right for using an unlicensed carrier. However, no proper LAA systems have been determined, especially, a contention withdrawal mechanism and procedure suitable for an LAA system have not been designed yet in the conventional art after the fairness for the contention mechanism of a Wireless Local Area Network (WLAN) system is taken into consideration.

No effective solutions have been proposed to address the problem that a contention withdrawal mechanism and procedure suitable for an LAA system are not provided in the conventional art.

SUMMARY

The main objective of the disclosure is to provide an unlicensed carrier contention method and apparatus to at least address the problem that a contention withdrawal mechanism and procedure suitable for an LAA system are not provided in the conventional art.

In accordance with an aspect of the disclosure, an unlicensed carrier contention method is provided, including that: an LAA device implements a Clear Channel Assessment (CCA) or an evolution Clear Channel Assessment (eCCA); if the result of the assessment is 'idle', the LAA device performs a decrement operation on N and determines whether or not the decremented N is greater than 0, wherein N is a natural number; and if the result of the determination indicates that the decremented N is not greater than 0, the LAA device uses an unlicensed carrier for data transmission.

Optionally, the method further comprises that: if the result of the assessment is 'busy', the LAA device implements the CCA or eCCA repeatedly until the result of the assessment is 'idle'.

Optionally, the method further comprises that: if the result of the determination indicates that the decremented N is greater than 0, the LAA device implements the CCA or eCCA repeatedly until the decremented N is not greater than 0.

Optionally, the step that the LAA device performs a decrement operation on N includes that: the LAA device decrements the local N progressively by a first specified value, wherein the first specified value is dynamically adjusted according to the priority of the data the LAA device needs to transmit.

Optionally, before the LAA device implements the CCA or eCCA, the method further comprises that: the LAA device acquires N.

Optionally, before the LAA device implements the CCA or eCCA repeatedly, the method further comprises that: the LAA device acquires N', wherein N' is a natural number smaller than the current N of the LAA device, and N is endowed with the value of N'.

Optionally, when the minimal value of N is a specified positive integer which is smaller or greater than the quotient of 34(μs) and the duration of a single CCA or eCCA by a value in a preset range, the method further comprises that: after N acquired by the LAA device is the minimal value, or the value obtained after the LAA device implements the decrement operation on N is the minimal value, the LAA device implements the CCA or eCCA continuously for the minimal value times; and the LAA device uses an unlicensed carrier for data transmission when the results of the minimal value times of CCA or eCCA are all 'idle'.

Optionally, the method further comprises that: if the results of the minimal value times of CCA or eCCA include 'busy', the LAA device continues to implement the CCA or eCCA for the minimal value times until the results of the minimal value times of CCA or eCCA are all 'idle'.

In accordance with another aspect of the disclosure, an unlicensed carrier contention method is provided, including that: an LAA device implements a CCA or an eCCA; if the result of the assessment is 'idle', the LAA device determines whether or not M is greater than 0, wherein M is a natural number; and if the result of the determination indicates that M is not greater than 0, the LAA device uses an unlicensed carrier for data transmission.

Optionally, the method further comprises that: if the result of the assessment is 'busy', the LAA device implements the CCA or eCCA repeatedly until the result of the assessment is 'idle'.

Optionally, the method further comprises that: the LAA device performs a decrement operation on M if the result of the determination indicates that M is greater than 0 and implements the CCA or eCCA repeatedly until the decremented M is not greater than 0.

Optionally, the step that the LAA device performs a decrement operation on M includes that: the LAA device decrements the local M by a second specified value, wherein the second specified value is dynamically adjusted according to the priority of the data the LAA device needs to transmit.

Optionally, before the LAA device implements the CCA or eCCA, the method further comprises that: the LAA device acquires M.

Optionally, before the LAA device implements the CCA or eCCA again, the method further comprises that: the LAA device acquires M', wherein M' is a natural number smaller than the current M of the LAA device, and M is endowed with the value of M'.

Optionally, when the minimal value of N is a specified positive integer which is smaller or greater than the quotient of 34($\mu$s) and the duration of a single CCA or eCCA by a value in a preset range, the method further comprises that: after N acquired by the LAA device is the minimal value, or the value obtained after the LAA device implements the decrement operation on N is the minimal value, the LAA device implements the CCA or eCCA continuously for the minimal value times; and the LAA device uses an unlicensed carrier for data transmission when the results of the minimal value times of CCA or eCCA are all 'idle'.

Optionally, the method further comprises that: if the results of the minimal value times of CCA or eCCA include 'busy', the LAA device continues to implement the CCA or eCCA for the minimal value times until the results of the minimal value times of CCA or eCCA are all 'idle'.

In accordance with another aspect of the disclosure, an unlicensed carrier contention method is provided, including that: an LAA device implements an initial CCA; the LAA device determines whether or not L is greater than 0 if the result of the assessment is 'busy', wherein L is a natural number; and the LAA device uses an unlicensed carrier for data transmission if the result of the determination indicates that L is not greater than 0.

Optionally, the method further comprises that: if the result of the assessment is 'idle', the LAA device uses an unlicensed carrier for data transmission.

Optionally, the method further comprises that: if the result of the determination indicates that L is greater than 0, the LAA device implements one CCA of an eCCA.

Optionally, the method further comprises that: if the result of the assessment is 'idle', the LAA device performs a decrement operation on L and subsequently determines whether or not the decremented L is greater than 0; and if the result of the assessment is 'busy', the LAA device continues to implement the initial CCA.

Optionally, the step that the LAA device performs a decrement operation on L includes that: the LAA device decrements the local L by a third specified value, wherein the third specified value is dynamically adjusted according to the priority of the data the LAA device needs to transmit.

Optionally, before the LAA device implements the CCA, the method further comprises that: the LAA device acquires L.

Optionally, before the LAA device implements the CCA of the eCCA or continues to implement the initial CCA, the method further comprises that: the LAA device acquires L', wherein L' is a natural number smaller than the current L of the LAA device, and L is endowed with the value of L'.

Optionally, the duration of the initial CCA is 34 $\mu$s or 40 $\mu$s.

In accordance with another aspect of the disclosure, an unlicensed carrier contention method is provided, including that: an LAA device implements an initial CCA; if the result of the assessment is 'idle', the LAA device determines whether or not the value resulting from the subtraction of a predetermined value from K is greater than 0, wherein K is a natural number; and the LAA device uses an unlicensed carrier for data transmission if the result of the determination indicates that the resulting value is not greater than 0.

Optionally, the method further comprises that: if the result of the determination indicates that the resulting value is greater than 0, the LAA device continues to implement one CCA of an eCCA.

Optionally, the method further comprises that: if the result of the assessment is 'busy', the LAA device determines whether or not the K is greater than 0, if the result of the determination indicates that K is not greater than 0, the LAA device uses an unlicensed carrier for data transmission; and if the result of the determination indicates that K is greater than 0, the LAA device continues to implement one CCA of the eCCA.

Optionally, the method further comprises that: if the result of the assessment is 'idle', the LAA device performs a decrement operation on K, and subsequently determines whether or not the decremented K is greater than 0; and if the result of the assessment is 'busy', the LAA device continues to implement the CCA, or the LAA device continues to implement a next CCA of the eCCA.

Optionally, the step that the LAA device performs a decrement operation on K includes that: the LAA device decrements the local K by a fourth specified value, wherein the fourth specified value is dynamically adjusted according to the priority of the data that the LAA device needs to transmit.

Optionally, before the LAA device implements the CCA, the method further comprises that: the LAA device acquires K.

Optionally, before the LAA device implements one CCA of the eCCA or continues to implement the initial CCA, the method further comprises that: the LAA device acquires K', wherein K' is a natural number smaller than the current K of the LAA device, and K is endowed with the value of K.

Optionally, the duration of the initial CCA is 34 $\mu$s or 40 $\mu$s.

Optionally, the predetermined value is a value which is smaller or greater than the quotient of the duration of the initial CCA and the duration of a single eCCA by a value in a preset range.

In accordance with another aspect of the disclosure, an unlicensed carrier contention apparatus located at an LAA device side is provided, including: a first implementation module arranged to implement a CCA or an eCCA; a first decrement module arranged to perform a decrement operation on N if the result of the assessment is 'idle' and determine whether or not the decremented N is greater than 0, wherein N is a natural number; and a first transmission module arranged to use an unlicensed carrier for data transmission if the result of the determination indicates that the decremented N is not greater than 0.

Optionally, the apparatus further comprises: a second implementation module arranged to implement, if the result of the assessment is 'busy', the CCA or eCCA repeatedly until the result of the assessment is 'idle'.

Optionally, the apparatus further comprises: a third implementation module arranged to implement, if the result of the determination indicates that the decremented N is greater than 0, the CCA or eCCA repeatedly until the decremented N is not greater than 0.

Optionally, the first decrement module is also arranged to decrement the local N by a first specified value, wherein the first specified value is dynamically adjusted according to the priority of the data that the LAA device needs to transmit.

Optionally, before the LAA device implements the CCA or eCCA, the apparatus further comprises: a first acquisition module arranged to acquire N.

Optionally, before the LAA device implements the CCA or eCCA again, the apparatus further comprises: a second acquisition module arranged to acquire N', wherein N' is a natural number smaller than the current N of the LAA device, and N is endowed with the value of N'.

Optionally, if the minimal value of N is a specified positive integer which is smaller or greater than the quotient of 34(μs) and the duration of a single CCA or eCCA by a value in a preset range, the apparatus further comprises: a fourth implementation module arranged to implement the CCA or eCCA continuously for the minimal value times after N acquired by the LAA device is the minimal value or the value obtained after the LAA device implements the decrement operation on N is the minimal value; and a second transmission module arranged to use an unlicensed carrier for data transmission if the results of the minimal value times of CCA or eCCA are all 'idle'.

Optionally, the apparatus further comprises: a fifth implementation module arranged to continue to implement the CCA or eCCA for the minimal value times until the results of the minimal value times of CCA or eCCA are all 'idle' if the results of the minimal value times of CCA or eCCA include 'busy'.

In accordance with still another aspect of the disclosure, an unlicensed carrier contention apparatus located at an LAA device side is provided, including: a sixth implementation module arranged to implement a CCA or an eCCA; a first determination module arranged to determine whether or not M is greater than 0 if the result of the assessment is 'idle', wherein M is a natural number; and a third transmission module arranged to use an unlicensed carrier for data transmission if the result of the determination indicates that M is not greater than 0.

Optionally, the apparatus further comprises: a seventh implementation module arranged to implement, if the result of the assessment is 'busy', the CCA or eCCA repeatedly until the result of the assessment is 'idle'.

Optionally, the apparatus further comprises: a second decrement module arranged to implement a decrement operation on M if the result of the determination indicates that M is greater than 0 and implement the CCA or eCCA repeatedly until the decremented M is not greater than 0.

Optionally, the second decrement module is also arranged to decrement the local M by a second specified value, wherein the second specified value is dynamically adjusted according to the priority of the data the LAA device needs to transmit.

Optionally, before the LAA device implements the CCA or eCCA, the apparatus further comprises: a third acquisition module arranged to acquire M.

Optionally, before the LAA device implements the CCA or eCCA again, the apparatus further comprises: a fourth acquisition module arranged to acquire M', wherein M' is a natural number smaller than the current M of the LAA device, and M is endowed with the value of M'.

Optionally, if the minimal value of the N is a specified positive integer which is smaller or greater than the quotient of 34(μs) and the duration of a single CCA or eCCA by a value in a preset range, the apparatus further comprises: an eighth implementation module arranged to implement the CCA or eCCA continuously for the minimal value times after N acquired by the LAA device is the minimal value or the value obtained after the LAA device implements the decrement operation on N is the minimal value; and a fourth transmission module arranged to use an unlicensed carrier for data transmission when the results of the minimal value times of CCA or eCCA are all 'idle'.

Optionally, the apparatus further comprises: a ninth implementation module arranged to continue to implement the CCA or eCCA for the minimal value times until the results of the minimal value times of CCA or eCCA are all 'idle' if the results of the minimal value times of CCA or eCCA include 'busy'.

In accordance with still another aspect of the disclosure, an unlicensed carrier contention apparatus located at an LAA device side is provided, including: a tenth implementation module arranged to implement an initial CCA; a second determination module arranged to determine whether or not L is greater than 0 if the result of the assessment is 'busy', wherein L is a natural number; and a fifth transmission module arranged to use an unlicensed carrier for data transmission if the result of the determination indicates that L is not greater than 0.

Optionally, the apparatus further comprises: a sixth transmission module arranged to use an unlicensed carrier for data transmission if the result of the assessment is 'idle'.

Optionally, the apparatus further comprises: an eleventh implementation module arranged to implement one CCA of an eCCA if the result of the determination indicates that L is greater than 0.

Optionally, the apparatus further comprises: a third decrement module arranged to implement a decrement operation on L if the result of the assessment is 'idle' and subsequently determine whether or not the decremented L is greater than 0; and a twelfth implementation module arranged to continue to implement the initial CCA if the result of the assessment is 'busy'.

Optionally, the third decrement module is arranged to decrement the local L by a third specified value, wherein the third specified value is dynamically adjusted according to the priority of the data taht the LAA device needs to transmit.

Optionally, before the LAA device implements the CCA, the apparatus further comprises: a fifth acquisition module arranged to acquire L.

Optionally, before the LAA device implements the CCA of the eCCA or continues to implement the initial CCA, the apparatus further comprises: a sixth acquisition module arranged to acquire L', wherein L' is a natural number smaller than the current L of the LAA device, and L is endowed with the value of L'.

Optionally, the duration of the initial CCA is 34 μs or 40 μs.

In accordance with yet still another aspect of the disclosure, an unlicensed carrier contention apparatus located at an LAA device side is provided, including: a thirteenth implementation module arranged to implement an initial CCA; a third determination module arranged to determine, if the result of the assessment is 'idle', whether or not the value resulting from the subtraction of a predetermined value from K is greater than 0, wherein K is a natural number; and a seventh transmission module arranged to use an unlicensed carrier for data transmission if the result of the determination indicates that the resulting value is not greater than 0.

Optionally, the apparatus further comprises: a fourteenth implementation module arranged to implement one CCA of the eCCA if the result of the determination indicates that the resulting value is greater than 0.

Optionally, the apparatus further comprises: a fourth determination module arranged to determine whether or not K is greater than 0 if the result of the assessment is 'busy'.

Optionally, the apparatus further comprises: an eighth transmission module arranged to use an unlicensed carrier for data transmission if the result of the determination indicates that K is not greater than 0; and a fifteenth implementation module arranged to continue to implement one CCA of the eCCA if the result of the determination indicates that K is greater than 0.

Optionally, the apparatus further comprises: a fourth decrement module arranged to implement a decrement operation on K if the result of the assessment is 'idle' and subsequently determine whether or not the decremented K is greater than 0; and a sixteenth implementation module arranged to continue to implement the CCA if the result of the assessment is 'busy', or the LAA device continues to implement a next CCA of the eCCA if the result of the assessment is 'busy'.

Optionally, the fourth decrement module is arranged to decrement the local K by a fourth specified value, wherein the fourth specified value is dynamically adjusted according to the priority of the data that the LAA device needs to transmit.

Optionally, before the LAA device implements the CCA, the apparatus further comprises: a seventh acquisition module arranged to acquire K.

Optionally, before the LAA device implements the CCA of the eCCA or continues to implement the initial CCA, the apparatus further comprises: an eighth acquisition module arranged to acquire K', wherein K' is a natural number smaller than the current K of the LAA device, and K is endowed with the value of K'.

Optionally, the duration of the initial CCA is 34 μs or 40 μs.

Optionally, the predetermined value is a value which is smaller or greater than the quotient of the duration of the initial CCA and that of a single eCCA by a value in a preset range.

In accordance with yet still another aspect of the disclosure, an unlicensed carrier contention method is provided, including that: an LAA device first performs a CCA on a channel and, after sensing the channel is idle during the CCA, proceeds to execute the following steps: S1: the LAA device decrements N and sets N=N−1 if N>0, wherein N is a nonnegative integer; S2: the LAA device senses the channel through the CCA, and executes S3 if the channel is sensed to be idle, otherwise executes S4; S3: the LAA uses an unlicensed carrier for data transmission if N=0, or executes S1; S4: the LAA device senses the channel through the CCA; and S5: if the channel is sensed to be idle, the LAA device executes S1 or S3, otherwise, the LAA device executes S4.

Optionally, prior to S1, the method further comprises the following step that: the LAA device randomly generates a random withdrawal number N.

Optionally, the CCA includes at least one of: an initial CCA and an eCCA.

Optionally, the CCA performed by the LAA device in S2 is one CCA of the eCCA, and the CCA continued by the LAA device in S4 is the same as the CCA initially performed by the LAA device, both being initial CCAs.

In accordance with yet still another aspect of the disclosure, an unlicensed carrier contention apparatus is provided, applied to an LAA device side and including: a first detection module arranged to implement a CCA first on a channel, and after sensing the channel is idle during the CCA, the apparatus functions through the following modules: a first determination module configured for the LAA device to decrement N and set N=N−1 if N>0, wherein the N is a nonnegative integer; a first processing module arranged to sense the channel through the CCA, and function through a transmission module if the channel is sensed to be idle, or function through a second detection module; the transmission module configured for the LAA device to use an unlicensed carrier for data transmission if N=0, or function through the first detection module; a second detection module configured for the LAA device to sense the channel through the CCA; and a first triggering module arranged to activate the first detection module or the processing module if the channel is sensed to be idle or activate the second detection module.

Optionally, before a CCA is performed, the apparatus further comprises: a first generation module arranged to generate the N randomly.

Optionally, the CCA includes at least one of: an initial CCA and an eCCA.

Optionally, the CCA continued in the first processing module is one CCA of the eCCA, that continued in the second detection module is an initial CCA, and that performed in the first detection module is an initial CCA.

In accordance with yet still another aspect of the disclosure, an unlicensed carrier contention method is provided, including that: an LAA device first implements a CCA on a channel and, after sensing the channel is idle during the CCA, proceeds to execute the following steps: S1: the LAA device executes S4; S2: if N>0, the LAA device decrements N and sets N=N−1, wherein N is a nonnegative integer; S3: the LAA device senses the channel through the CCA and, if the channel is sensed to be idle, executes S4, otherwise, executes S5; S4: the LAA device uses an unlicensed carrier for data transmission if N=0 or executes S2; S5: the LAA device senses the channel through the CCA; and S6: if the channel is sensed to be idle, the LAA device executes S2 or S4, otherwise, the LAA device executes S5.

Optionally, prior to S1, the method further comprises the following step that: the LAA device randomly generates a random withdrawal number N.

Optionally, the CCA includes at least one of: an initial CCA and an eCCA.

Optionally, the CCA performed by the LAA device in S3 is one CCA of the eCCA, and the CCA continued by the LAA device in S5 is the same as the CCA initially performed by the LAA device, both being initial CCAs.

In accordance with yet still another aspect of the disclosure, an unlicensed carrier contention apparatus is provided, applied to an LAA device side and including: a third detection module arranged to implement a CCA on a channel first, and after sensing the channel is idle during the CCA, the apparatus continues to function through the following modules: a second triggering module arranged to activate a second processing module; a second determination module arranged to decrement N and set N=N−1 if N>0, wherein N is a nonnegative integer; a third detection module arranged to sense the channel through the CCA and activate the second processing module if the channel is sensed to be idle or activate a fourth detection module; the second processing module arranged for the LAA device to use an unlicensed carrier for data transmission if N=0, or activate the second determination module; a fourth detection module arranged to sense the channel through the CCA; and a third triggering module arranged to activate the second triggering module or the second processing module if the channel is sensed to be idle or activate the fourth detection function if no idle channel is detected.

Optionally, before the second triggering module functions, the apparatus further comprises: a second generation module arranged to randomly generate a random withdrawal number N.

Optionally, the CCA includes at least one of: an initial CCA and an eCCA.

Optionally, the CCA performed in the third detection module is one CCA of the eCCA, and the CCA continued in the fourth detection module is the same as the CCA initially performed by the third detection module, both being initial CCAs.

The embodiments of the disclosure also provides a computer memory medium having executable instructions stored thereon, which is configured to execute the unlicensed carrier contention methods described in the foregoing embodiments.

In embodiments of the disclosure, an LAA device performs a CCA or an eCCA, if the result of the assessment is 'idle', the LAA device performs a decrement operation on N and determines whether or not the decremented N is greater than 0, wherein N is a natural number; and if the result of the determination indicates that the decremented N is not greater than 0, the LAA device uses an unlicensed carrier for data transmission, thus addressing the problem that no contention withdrawal mechanism or procedure suitable for an LAA system is provided in the conventional art.

BRIEF DESCRIPTION OF THE DRAWINGS

The accompanying drawings described herein which are incorporated into and form a part of the application are provided for the better understanding of the disclosure, and exemplary embodiments of the disclosure and description thereof serve to illustrate the disclosure but are not to be construed as improper limitations to the disclosure. In the accompanying drawings.

DETAILED DESCRIPTION

It should be noted that the embodiments of the disclosure and the features thereof can be combined with each other if no conflict is caused. The disclosure will be described below in detail with reference to accompanying drawings when read in conjunction with specific embodiments.

Figure 1:
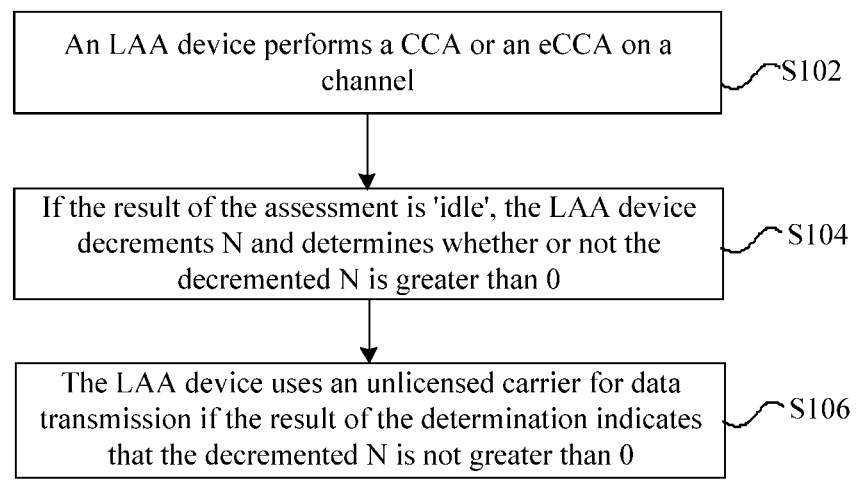
FIG. 1 is a flowchart 1 of an unlicensed carrier contention method according to an embodiment of the disclosure.

An unlicensed carrier contention method is provided in the embodiment. FIG. 1 is a flowchart 1 of an unlicensed carrier contention method according to an embodiment of the disclosure. As shown in FIG. 1, the method includes the following steps:

S102: an LAA device performs a CCA or an eCCA;

S104: if the result of the assessment is 'idle', the LAA device performs a decrement operation on N and determines whether or not the decremented N is greater than 0, wherein N is a natural number; and S106: the LAA device uses an unlicensed carrier for data transmission if the result of the determination indicates that the decremented N is not greater than 0.

By executing the foregoing steps S102-S106, an LAA device performs a CCA or an eCCA, if the result of the assessment is 'idle', the LAA device performs a decrement operation on N and determines whether or not the decremented N is greater than 0, and if the result of the determination indicates that the decremented N is not greater than 0, the LAA device uses an unlicensed carrier for data transmission, that is, a procedure is provided in the embodiment for an LAA device to obtain an unlicensed carrier when the LAA device competes for a right for using an unlicensed carrier, thus addressing the problem that no contention withdrawal mechanism or procedure suitable for an LAA system is provided in the conventional art and consequentially avoiding the interference resulted from the synchronous use of unlicensed carriers by neighboring transmission nodes of the same system.

With respect to the result obtained after the LAA device implements a CCA or an eCCA in S102, in an optional implementation mode of the embodiment, if the result of the assessment is 'busy', the LAA device implements the CCA or eCCA repeatedly until the result of the assessment is 'idle'.

With respect to the result of the determination in S104, in another optional implementation mode of the embodiment, if the result of the determination indicates that the decremented N is greater than 0, the LAA device implements the CCA or eCCA repeatedly until the decremented N is not greater than 0.

It should be noted that during the foregoing process the CCA or eCCA is implemented repeatedly, the LAA device needs to perform a decrement operation on the decremented number N in the foregoing implementation mode, the numerical value N involved here is a local numerical value N involved in the embodiment, but the numerical value N involved here is a number N subjected to a decrement operation. This explanation is applicable to other implementation modes of the embodiment.

Besides, with respect to the way the LAA device performs a decrement operation on N in S104 in the embodiment, optionally, in an application scenario of the embodiment, the LAA device may perform the decrement operation in the following way: the LAA device decrements the N by a first specified value, wherein the first specified value is dynamically adjusted according to the priority of the data the LAA device needs to transmit. That is, in the embodiment, the decrement magnitude of the decrement operation is related to the priority of the data the LAA device needs to transmit, in other words, the higher the priority of the data the LAA device needs to transmit, the larger the decrement magnitude, for example, generally, the decrement magnitude is 2, that is, N=N−2. When the data the LAA device plans to send has a relatively high priority, the decrement magnitude is relatively large, for example, N=N−4. In this way, the LAA device can highly probably obtain a right for using an unlicensed carrier, thereby realizing a dynamic adjustment.

It should be noted that prior to S102, that is, before the LAA device implements the CCA or eCCA, the method provided in the embodiment may optionally include that: the LAA device acquires a numerical value N. The numerical value N may be randomly generated by the LAA device or configured by another device for the LAA device, and the maximum value of N can be predetermined.

In still another optional implementation mode of the embodiment, before the LAA device performs the CCA or eCCA again, the method of the embodiment may further include that: the LAA device acquires a numerical value N', wherein N' is a natural number smaller than the current N of the LAA device, and N is endowed with the value of N'.

It should be noted that N' is acquired here in the same way for acquiring the N, that is, N or N' is generated by the LAA device randomly or configured by another device for the LAA device, additionally, this explanation is applicable to other implementation modes of the embodiment.

By acquiring a new value which is smaller than the current value of the device, a CCA or eCCA is continued on the new value acquired, thus avoiding, to a certain degree, the resource waste caused by an overlong CCA/eCCA process.

In the method of the foregoing embodiment, the LAA device does not consider the fairness for a Wireless Fidelity (wifi) system in contention. In a case where the LAA device fails to take the fairness for a wifi system in contention into consideration, the lower limit of the N is set to be 0, in a case where the LAA device takes the fairness for a wifi system in contention into consideration, the lower limit of the N is a specified positive integer which is smaller or greater than the quotient of 34($\mu$s) and the duration of a single CCA or eCCA by a value in a preset range,. Based on this, in another optional implementation mode of the embodiment, the method of the embodiment may further include the following steps:

S11: after the N acquired by the LAA device is a minimal value or the value resulting from the decrement operation performed by the LAA device on the N is a minimal value, the LAA device implements the CCA or eCCA continuously for the minimal value times;

S12: when the results of the minimal value times of CCA or eCCA are all 'idle', the LAA device uses an unlicensed carrier for data transmission; and S13: if the results of the minimal value times of CCA or eCCA include 'busy', the LAA device continues to implement the CCA or eCCA continuously for the minimal value times until the results of the minimal value times of CCA or eCCA are all 'idle'.

Figure 2:
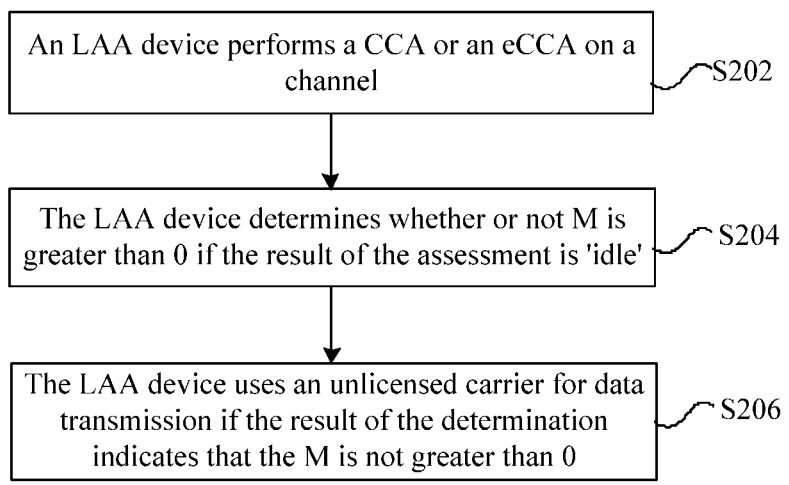
FIG. 2 is a flowchart 2 of an unlicensed carrier contention method according to an embodiment of the disclosure.

FIG. 2 is a flowchart 2 of an unlicensed carrier contention method according to an embodiment of the disclosure, As shown in FIG. 2, the method includes the following steps:

S202: an LAA device performs a CCA or an eCCA;

S204: the LAA device determines whether or not M is greater than 0 if the result of the assessment is 'idle', wherein M is a natural number; and S206: the LAA device uses an unlicensed carrier for data transmission if the result of the determination indicates that M is not greater than 0.

According to the foregoing steps S202-S206, an LAA device implements a CCA or an eCCA, the LAA device performs a determination operation on M if the result of the assessment is 'idle', wherein the M is a natural number, and if the result of the determination indicates that M is not greater than 0, the LAA device uses an unlicensed carrier for data transmission. That is, a procedure is provided in the embodiment for an LAA device to obtain an unlicensed carrier when the LAA device competes for a right for using an unlicensed carrier, thus addressing the problem that no contention withdrawal mechanism or procedure suitable for an LAA system is provided in the conventional art and consequentially avoiding the interference resulted from the synchronous use of unlicensed carriers by neighboring transmission nodes of the same system.

With respect to the result obtained after the LAA device implements a CCA or an eCCA in S202, in an optional implementation mode of the embodiment, if the result of the assessment is 'busy', the LAA device implements the CCA or eCCA repeatedly until the result of the assessment is 'idle'.

With respect to the result of the determination in S204, in another optional implementation mode of the embodiment, if the result of the determination indicates that M is greater than 0, the LAA device performs a decrement operation on the M and implements the CCA or eCCA repeatedly until the decremented M is not greater than 0.

Besides, with respect to the way the LAA device performs a decrement operation on M in the embodiment, optionally, in an application scenario of the embodiment, the LAA device may perform the decrement operation in the following way: the LAA device decrements M by a second specified value, wherein the second specified value is dynamically adjusted according to the priority of the data the LAA device needs to transmit. That is, in the embodiment, the decrement magnitude of the decrement operation is related to the priority of the data the LAA device needs to transmit, in other words, the higher the priority of the data the LAA device needs to transmit, the larger the decrement magnitude, for example, generally, the decrement magnitude is 2, that is, M=M−2. If the data the LAA device plans to send has a relatively high priority, the decrement magnitude is relatively large, for example, M=M−4. In this way, the LAA device can highly probably obtain a right for using an unlicensed carrier, thereby realizing a dynamic adjustment.

It should be noted that prior to S202, that is, before the LAA device implements the CCA or eCCA, optionally, the method provided in the embodiment may include that: the LAA device acquires a numerical value M. The M may be randomly generated by the LAA device or configured by another device for the LAA device, and the maximum value of M can be predetermined.

In still another optional implementation mode of the embodiment, before the LAA device performs the CCA or eCCA again, the method of the embodiment may further include that: the LAA device acquires a numerical value M', wherein M' is a natural number smaller than the current M of the LAA device, and M is endowed with the value of M'. By acquiring a new value which is smaller than the current value of the device, the resource waste caused by an overlong CCA/eCCA process is avoided to a certain degree.

In the method of the foregoing embodiment, the LAA device does not consider the fairness for a Wireless Fidelity (wifi) system in contention. In a case where the LAA device fails to take the fairness for a wifi system in contention into consideration, the lower limit of the M is set to be 0, in a case where the LAA device takes the fairness for a wifi system in contention into consideration, the lower limit of the M is a specified positive integer which is smaller or greater than the quotient of 34(μs) and the duration of a single CCA or eCCA by a value in a preset range, Based on this, in another optional implementation mode of the embodiment, the method of the embodiment may further include the following steps:

S21: after the N acquired by the LAA device is a minimal value or the value resulting from the decrement operation performed by the LAA device on the N is a minimal value, the LAA device implements the CCA or eCCA continuously for the minimal value times;

S22: when the results of the minimal value times of CCA or eCCA are all 'idle', the LAA device uses an unlicensed carrier for data transmission; and S23: the LAA device continues to implement, if the results of the minimal value times of CCA or eCCA include 'busy', the CCA or eCCA continuously for the minimal value times until the results of the minimal value times of CCA or eCCA are all 'idle'.

Figure 3:
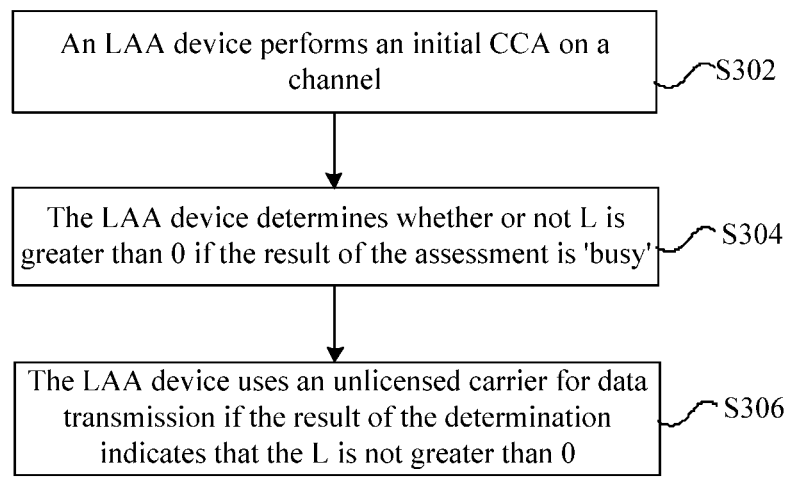
FIG. 3 is a flowchart 3 of an unlicensed carrier contention method according to an embodiment of the disclosure.

FIG. 3 is a flowchart 3 illustrating an unlicensed carrier contention method according to an embodiment of the disclosure, and as shown in FIG. 3, the method provided in the embodiment includes the following steps:

S302: an LAA device performs an initial CCA;

S304: the LAA device determines whether or not L is greater than 0 if the result of the assessment is 'busy', wherein L is a natural number; and S306: the LAA device uses an unlicensed carrier for data transmission if the result of the determination indicates that L is not greater than 0.

By executing Steps S302-S304 of the embodiment, an LAA device implements an initial CCA, the LAA device determines whether or not L is greater than 0 if the result of the assessment is 'busy', wherein L is a natural number, and the LAA device uses an unlicensed carrier for data transmission if the result of the determination indicates that L is not greater than 0, so as to address the problem that no contention withdrawal mechanism or procedure suitable for an LAA system is provided in the conventional art, and avoid consequentially the interference resulted from the synchronous use of unlicensed carriers by neighboring transmission nodes of the same system.

Optionally, the method of the embodiment may further include that: if the result of the assessment is 'idle', the LAA device uses an unlicensed carrier for data transmission.

In the step S304 of the embodiment, if the result of the determination performed by the LAA device indicates that the L is greater than 0, optionally, the LAA device implements one CCA of an eCCA.

With respect to the result obtained after the LAA device implements one CCA of an eCCA, if the result of the assessment is 'idle', the LAA device performs a decrement operation on the L and subsequently determines whether or not the decremented L is greater than 0, and if the result of the assessment is 'busy', the LAA device continues to implement the initial CCA.

It should be noted that during the process of continuing to implement the initial CCA or implementing one CCA of an eCCA involved in the embodiment, in the foregoing implementation mode, the LAA device needs to perform a decrement operation on the decremented L, the numerical value L involved here is a local numerical value L involved in the embodiment, but the numerical value L here is a numerical value L subjected to a decrement operation. This explanation is applicable to other implementation modes of the embodiment.

In an optional implementation mode of the embodiment, the foregoing decrement operation performed by the LAA device on the L may be as follows: the LAA device decrements L by a third specified value, wherein the third specified value is dynamically adjusted according to the priority of the data the LAA device needs to transmit. That is, in the embodiment, the decrement magnitude of the decrement operation is related to the priority of the data the LAA device needs to transmit, in other words, the higher the priority of the data the LAA device needs to transmit, the larger the decrement magnitude, and generally, the decrement magnitude is 2, that is, L=L−2. When the data the LAA device plans to send has a relatively high priority, the decrement magnitude is relatively large, for example, L=L−4. In this way, the LAA device can highly probably obtain a right for using an unlicensed carrier, thereby realizing a dynamic adjustment.

In another optional implementation mode of the embodiment, before the LAA device implements the CCA, the method may further include that: the LAA device acquires a numerical value L. The numerical value L may be randomly generated by the LAA device or configured by another device for the LAA device, and the maximum value of L can be predetermined.

Moreover, before the LAA device implements one CCA of the eCCA or continues to implement the initial CCA, the method of the embodiment may further include that: the LAA device acquires a numerical value L', wherein L' is a natural number smaller than the current L of the LAA device, and L is endowed with the value of L'.

By acquiring a new value which is smaller than the current value of the device, the resource waste caused by an overlong CCA/eCCA process is avoided to a certain degree.

It should be noted that the duration of the initial CCA involved in the embodiment is 34 μs or 40 μs.

Figure 4:
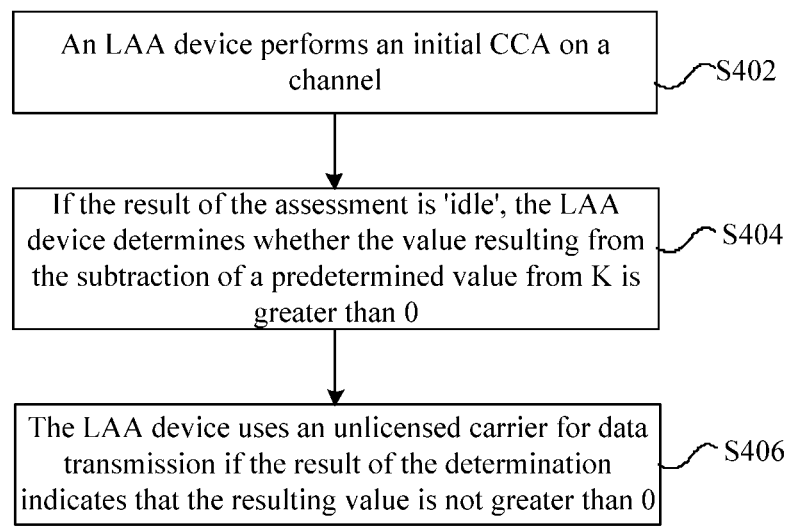
FIG. 4 is a flowchart 4 of an unlicensed carrier contention method according to an embodiment of the disclosure.

FIG. 4 is a flowchart 4 of an unlicensed carrier contention method according to an embodiment of the disclosure, and as shown in FIG. 4, the method includes the following steps:

S402: an LAA device performs an initial CCA;

S404: if the result of the assessment is 'idle', the LAA device determines whether or not the value obtained by the subtraction of a predetermined value from K is greater than 0, wherein K is a natural number; and S406: the LAA device uses an unlicensed carrier for data transmission if the result of the determination indicates that the resulting value is not greater than 0.

By executing Steps S402-S404 of the embodiment, an LAA device implements an initial CCA, the LAA device determines whether or not K is greater than 0 if the result of the assessment is 'idle', wherein K is a natural number, and the LAA device uses an unlicensed carrier for data transmission if the result of the determination indicates that K is not greater than 0, so as to address the problem that no contention withdrawal mechanism or procedure suitable for an LAA system is provided in the conventional art, and avoid consequentially the interference resulted from the synchronous use of unlicensed carriers by neighboring transmission nodes of the same system.

When the result of the determination performed by the LAA device indicates that the decremented K is greater than 0, optionally, the method of the embodiment may further include that: the LAA device continues to implement one CCA of an eCCA.

With respect to the CCA implementation of S402, optionally, if the result of the assessment is 'busy', the LAA device determines whether or not the K is greater than 0, as for the result of the determination, if the result of the determination indicates that the K is not greater than 0, the LAA device uses an unlicensed carrier for data transmission, and if the result of the determination indicates that the K is greater than 0, the LAA device continues to implement one CCA of an eCCA.

If the result obtained after the LAA device continues to implement one CCA of an eCCA is 'idle', the LAA device performs a decrement operation on the K and subsequently determines whether or not the decremented K is greater than 0; and if the result is 'busy', the LAA device continues to implement the initial CCA, or the LAA device continues to implement the next CCA of the eCCA.

However, with respect to the way the LAA device performs a decrement operation on the K in the embodiment, in another optional implementation mode of the embodiment, the way may be as follows: the LAA device decrements the K by a fourth specified value, wherein the fourth specified value is dynamically adjusted according to the priority of the data the LAA device needs to transmit. That is, in the embodiment, the decrement magnitude of the decrement operation is related to the priority of the data the LAA device needs to transmit, in other words, the higher the priority of the data the LAA device needs to transmit, the larger the decrement magnitude, for example, generally, the decrement magnitude is 2, that is, K=K−2. If the data the LAA device plans to send has a relatively high priority, the decrement magnitude is relatively large, for example, K=K−4. In this way, the LAA device can highly probably obtain a right for using an unlicensed carrier, thereby realizing a dynamic adjustment.

In the embodiment, prior to S402, that is, before the LAA device performs a CCA, the method of the embodiment may further include that: the LAA device acquires a numerical value K. The numerical value K may be randomly generated by the LAA device or configured by another device for the LAA device, and the maximum value of K can be predetermined.

Additionally, before the LAA device implements one CCA of the eCCA or continues to implement the initial CCA, the method of the embodiment may further include that: the LAA device acquires a numerical value K', wherein K' is a natural number smaller than the current K of the LAA device, and K is endowed with the value of K'.

By acquiring a new value which is smaller than the current value of the device, the resource waste caused by an overlong CCA/eCCA process is avoided to a certain degree.

Optionally, the duration of the initial CCA involved in the embodiment is 34 μs or 40 μs, and the predetermined value is a value which is smaller or greater than the quotient of the duration of the initial CCA and that of a single eCCA by a value in a preset range.

An unlicensed carrier contention apparatus is also provided herein to realize the foregoing embodiments and preferred implementation modes, and the content described above is not described hereinafter repeatedly. The terms 'module', as used hereinafter, are combinations of software and/or hardware for realizing predetermined functions. Although the apparatuses described in the following embodiments are preferably implemented as software, the implementation of the apparatuses as hardware or the combination of software and hardware may also be devised.

Figure 5:
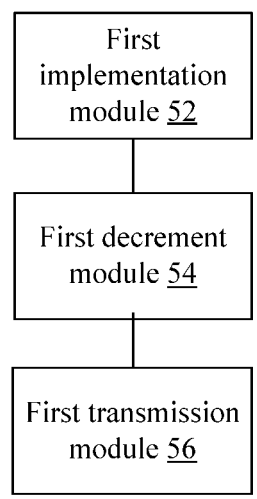
FIG. 5 is a block diagram 1 of an unlicensed carrier contention apparatus according to an embodiment of the disclosure.

FIG. 5 is a block diagram 1 of an unlicensed carrier contention apparatus according to an embodiment of the disclosure. As shown in FIG. 5, the apparatus located at an LAA device side includes: a first implementation module 52 arranged to implement a CCA or an eCCA; a first decrement module 54 coupled with the first implementation module 52 and arranged to perform a decrement operation on N if the result of the assessment is 'idle' and determine whether or not the decremented N is greater than 0, wherein N is a natural number; and a first transmission module 56 coupled with the first decrement module 54 and arranged to use an unlicensed carrier for data transmission if the result of the determination indicates that the decremented N is not greater than 0.

Optionally, the apparatus may further include: a second implementation coupled with the first implementation module 52 and arranged to implement, if the result of the assessment is 'busy', the CCA or eCCA repeatedly until the result of the assessment is 'idle'.

Optionally, the apparatus may further include: a third implementation module coupled with the first decrement module 54 and arranged to implement, if the result of the determination indicates that the decremented N is greater than 0, the CCA or eCCA repeatedly until the decremented N is not greater than 0.

Optionally, the first decrement module 52 is further arranged to decrement N by a first specified value, wherein the first specified value is dynamically adjusted according to the priority of the data the LAA device needs to transmit.

Optionally, before the LAA device implements the CCA or eCCA, the apparatus may further include: a first acquisition module coupled with the first implementation module 52 and arranged to acquire a numerical value of N.

Optionally, before the LAA device implements the CCA or eCCA again, the apparatus further comprises: a second acquisition module coupled with the first transmission module 56 and arranged to acquire a numerical value N', wherein N' is a natural number smaller than the current N of the LAA device, and N is endowed with the value of N'.

In the method of the foregoing embodiment, the LAA device does not consider the fairness for a Wireless Fidelity (wifi) system in contention. In a case where the LAA device fails to take the fairness for a wifi system in contention into consideration, the lower limit of the N is set to be 0, in a case where the LAA device takes the fairness for a wifi system in contention into consideration, the lower limit of the N is a specified positive integer which is smaller or greater than the quotient of 34(μs) and the duration of a single CCA or eCCA by a value in a preset range, based on this, in another optional implementation mode of the embodiment, the apparatus provided in the embodiment may further include:

a fourth implementation module arranged to implement, after the N acquired by the LAA device is a minimal value or the value resulting from the decrement operation performed by the LAA device on the N is a minimal value, the CCA or eCCA continuously for a minimal value times;

a second transmission module arranged to use an unlicensed carrier for data transmission if the results of the minimal value times of CCA or eCCA are all 'idle'; and a fifth implementation module arranged to implement, if the results of the minimal value times of CCA or eCCA include 'busy', the CCA or eCCA continuously for the minimal value times until the results of the minimal value times of CCA or eCCA are all 'idle'.

Figure 6:
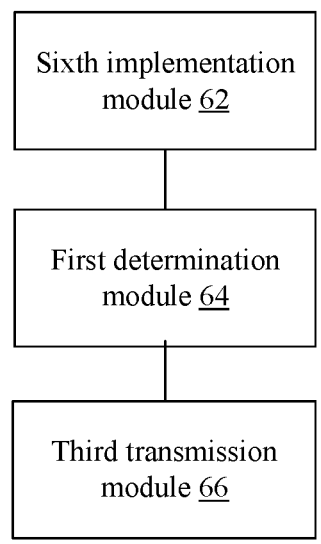
FIG. 6 is a block diagram 2 of an unlicensed carrier contention apparatus according to an embodiment of the disclosure.

FIG. 6 is a block diagram 2 of an unlicensed carrier contention apparatus according to an embodiment of the disclosure, and as shown in FIG. 6, the apparatus located at an LAA device side includes: a sixth implementation module 62 arranged to implement a CCA or an eCCA; a first determination module 64 coupled with the sixth implementation module 62 and arranged to determine whether or not M is greater than 0 if the result of the assessment is 'idle', wherein M is a natural number; and a third transmission module 66 coupled with the first determination module 64 and arranged to use an unlicensed carrier for data transmission if the result of the determination indicates that M is not greater than 0.

Optionally, the apparatus may further include: a seventh implementation module coupled with the fourth implementation module 62 and arranged to implement, if the result of the assessment is 'busy', the CCA or eCCA repeatedly until the result the assessment is 'idle'.

Optionally, the apparatus further comprises: a second decrement module coupled with the first determination module 64 and arranged to implement a decrement operation on the M if the result of the determination indicates that M is greater than 0 and implement the CCA or eCCA repeatedly until the decremented M is not greater than 0.

Optionally, the second decrement module is further arranged to decrement M by a second specified value, wherein the second specified value is dynamically adjusted according to the priority of the data the LAA device needs to transmit.

Optionally, before the LAA device implements the CCA or eCCA, the apparatus may further include: a third acquisition module coupled with the fourth implementation module 62 and arranged to acquire a numerical value of M.

Optionally, before the LAA device implements the CCA or eCCA again, the apparatus may further include: a fourth acquisition module coupled with the second transmission module 66 and arranged to acquire a numerical value M', wherein M' is a natural number smaller than the current M of the LAA device, and M is endowed with the value of M'.

In the method of the foregoing embodiment, the LAA device does not consider the fairness for a Wireless Fidelity (wifi) system in contention. In a case where the LAA device fails to take the fairness for a wifi system in contention into consideration, the lower limit of the N is set to be 0, in a case where the LAA device takes the fairness for a wifi system in contention into consideration, the lower limit of the N is a specified positive integer which is smaller or greater than the quotient of 34(μs) and the duration of a single CCA or eCCA by a value in a preset range. Based on this, in another optional implementation mode of the embodiment, the apparatus provided in the embodiment may further include:

an eighth implementation module arranged to implement, after the N acquired by the LAA device is a minimal value or the value resulting from the decrement operation performed by the LAA device on the N is a minimal value, the CCA or eCCA continuously for the minimal value times;

a fourth transmission module arranged to use an unlicensed carrier for data transmission if the results of the minimal value times of CCA or eCCA are all 'idle': and a ninth implementation module arranged to implement, if the results of the minimal value times of CCA or eCCA include 'busy', the CCA or eCCA continuously for the minimal value times until the results of the minimal value times of CCA or eCCA are all 'idle'.

Figure 7:
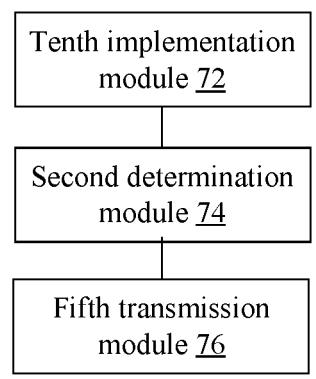
FIG. 7 is a block diagram 3 of an unlicensed carrier contention apparatus according to an embodiment of the disclosure.

FIG. 7 is a block diagram 3 of an unlicensed carrier contention apparatus according to an embodiment of the disclosure. As shown in FIG. 7, the apparatus located at an LAA device side includes: a tenth implementation module 72 arranged to implement an initial CCA; a second determination module 74 coupled with the tenth implementation module 72 and arranged to determine whether or not L is greater than 0 if the result of the assessment is 'idle', wherein L is a natural number; and a fifth transmission module 76 coupled with the second determination module 74 and arranged to use an unlicensed carrier for data transmission if the result of the determination indicates that the L is not greater than 0.

Optionally, the apparatus may further include: a sixth transmission module coupled with the tenth implementation module 72 and arranged to use an unlicensed carrier for data transmission if the result of the assessment is 'idle'.

Optionally, the apparatus may further include: an eleventh implementation module coupled with the second determination module 74 and arranged to implement one CCA of an eCCA if the result of the determination indicates that L is greater than 0.

Optionally, the apparatus may further include: a third decrement module coupled with the seventh implementation module and arranged to implement a decrement operation on the L if the result of the assessment is 'idle' and subsequently determine whether or not the decremented L is greater than 0; and a twelfth implementation module coupled with the eleventh implementation module and arranged to continue to implement the initial CCA if the result of the assessment is 'busy'.

Optionally, the third decrement module is further arranged to decrement the L by a third specified value, wherein the third specified value is dynamically adjusted according to the priority of the data the LAA device needs to transmit.

Optionally, before the LAA device implements the CCA, the apparatus further comprises: a fifth acquisition module coupled with the tenth implementation module 72 and arranged to acquire a numerical value of L.

Optionally, before the LAA device implements the CCA of the eCCA or continues to implement the initial CCA, the apparatus further comprises: a sixth acquisition module coupled separately with the third transmission module 76 and the fourth transmission module and arranged to acquire a numerical value L', wherein L' is a natural number smaller than the current L of the LAA device, and L is endowed with the value of L'.

It should be noted that the duration of the initial CCA involved in the embodiment is 34 μs or 40 μs.

Figure 8:
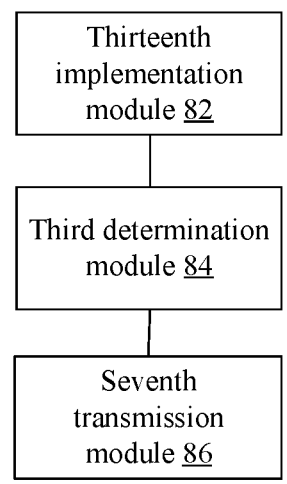
FIG. 8 is a block diagram 4 of an unlicensed carrier contention apparatus according to an embodiment of the disclosure.

FIG. 8 is a block diagram 4 of an unlicensed carrier contention apparatus according to an embodiment of the disclosure, and as shown in FIG. 8, the apparatus located at an LAA device side includes: a thirteenth implementation module 82 arranged to implement an initial CCA; a third determination module 84 coupled with the thirteenth implementation module 82 and arranged to determine, if the result of the assessment is 'idle', whether or not the value obtained by the subtraction of a predetermined value from K is greater than 0, wherein K is a natural number; and a seventh transmission module 86 coupled with the third determination module 84 and arranged to use an unlicensed carrier for data transmission if the result of the determination indicates that the resulting value is not greater than 0.

Optionally, the apparatus may further include: a fourteenth implementation module coupled with the third determination module 84 and arranged to implement one CCA of an eCCA if the result of the determination indicates that the resulting value is greater than 0.

Optionally, the apparatus further comprises: a fourth determination module coupled with the tenth implementation module and arranged to determine whether or not K is greater than 0 if the result of the assessment is 'busy';

an eighth transmission module coupled with the fourth determination module and arranged to use an unlicensed carrier for data transmission if the result of the determination indicates that K is not greater than 0; and a fifteenth implementation module coupled with the fourth determination module and arranged to continue to implement one CCA of the eCCA if the result of the determination indicates that K is greater than 0.

Optionally, the apparatus further comprises: a fourth decrement module coupled with the fifteenth implementation module and arranged to implement a decrement operation on the K if the result of the assessment is 'idle' and subsequently determine whether or not the decremented K is greater than 0; and a sixteenth implementation module coupled with the fifteenth implementation module and arranged to continue to implement a CCA if the result of the assessment is 'busy', or the LAA device continues to implement the next CCA of the eCCA if the result of the assessment is 'busy'.

Optionally, the fourth decrement module is further arranged to decrement the K by a fourth specified value, wherein the fourth specified value is dynamically adjusted according to the priority of the data the LAA device needs to transmit.

Optionally, before the LAA device implements the CCA, the apparatus further comprises: a seventh acquisition module coupled with the ninth implementation module 82 and arranged to acquire a numerical value of K.

Optionally, before the LAA device implements one CCA of the eCCA or continues to implement the initial CCA, the apparatus further comprises: an eighth acquisition module coupled separately with the seventh transmission module 86 and the eighth transmission module and arranged to acquire a numerical value K', wherein K' is a natural number smaller than the current K of the LAA device, and K is endowed with the value of K'.

It should be noted that the duration of the initial CCA involved in the embodiment is 34 μs or 40 μs, and the predetermined value is a value which is smaller or greater than the quotient of the duration of the initial CCA and that of a single eCCA by a value in a preset range.

The disclosure is described below in detail with reference to optional embodiments of the disclosure.

A contention withdrawal mechanism and a corresponding procedure which are suitable for an LAA system are provided in the optional embodiments, wherein the procedure may include the following modes:

Mode 1

An LAA device acquires a numerical value N.

The LAA device performs a CCA or an eCCA, if the result of the assessment is 'busy', the LAA device implements the next CCA/eCCA (executes Step A repeatedly), and if the result of the assessment is 'idle', the LAA device performs a decrement operation on N.

The LAA device determines whether or not N is greater than 0. If the result of the determination is 'No' (that is, N=0), the LAA device uses an unlicensed carrier for transmission, and when the result of the determination is 'Yes', the LAA device executes Step A repeatedly.

Mode 2

An LAA device acquires a numerical value N.

The LAA device performs a CCA/eCCA. The LAA device performs the next CCA/eCCA if the result of the assessment is 'busy', or determines whether or not N is greater than 0 if the result of the assessment is 'idle'. If the result of the determination is 'No', the LAA device uses an unlicensed carrier for transmission, and if the result of the determination is 'Yes', the LAA device performs a decrement operation on N and synchronously returns to perform a CCA/eCCA.

Mode 3

An LAA device acquires a numerical value N before or when performing a CCA or an eCCA.

The LAA device performs an initial CCA, if the result of the CCA is 'idle', the LAA device uses an unlicensed carrier for data transmission, if the result of the CCA is 'busy', the LAA device determines whether or not the N is greater than 0, if the result of the determination is that the N is not greater than 0, the LAA device uses an unlicensed carrier for data transmission; if the result of the determination is that the N is greater than 0, the LAA device proceeds to an eCCA to implement a CCA; if the result of the assessment is 'idle', then the LAA device performs a decrement operation on the N and synchronously returns to the entry of determining whether or not the N is greater than 0; and if the result of the assessment is 'busy', the LAA device returns to the entry of implementing the initial CCA.

Mode 4

An LAA device acquires a numerical value N before or when performing a CCA or an eCCA.

The LAA device performs an initial CCA, if the result of the CCA is 'idle', the LAA device determines whether or not N−1 is greater than 0, if the result of the determination is 'No', the LAA device uses an unlicensed carrier for data transmission, otherwise, the LAA device proceeds to an eCCA to perform a CCA; if the result of the CCA is 'busy', then the LAA device determines whether or not N is greater than 0, if the result of the determination is that the N is not greater than 0, the LAA device uses an unlicensed carrier for data transmission, if the result of the determination is that the N is greater than 0, the LAA device proceeds to an eCCA to perform a CCA, if the result of the assessment is 'idle', the LAA device performs a decrement operation on the N and synchronously returns to the entry of determining whether or not the N is greater than 0, and if the result of the assessment is 'busy', the LAA device returns to the entry of implementing the initial CCA.

The disclosure is described below in detail with reference to specific embodiments in conjunction with accompanying drawings.

Embodiment 1

Figure 9:
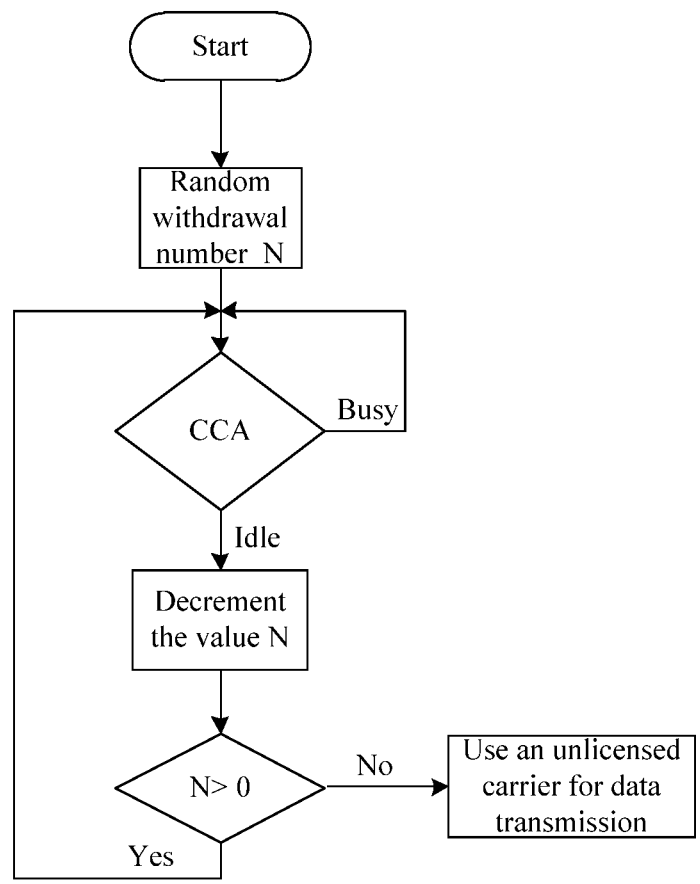
FIG. 9 is a schematic diagram 1 of an unlicensed carrier contention method according to an optional embodiment of the disclosure.

Corresponding to Mode 1 of the optional embodiment, FIG. 9 is a schematic diagram illustrating an unlicensed carrier contention method according to an optional embodiment of the disclosure. As shown in FIG. 9, an LAA device obtains a right for using an unlicensed carrier by performing a CCA or an eCCA according to the following procedure, wherein the LAA device may be any device using unlicensed carriers, for example, a base station, a small cell, a homeNB and a UE.

The LAA device acquires a numerical value N, wherein N may be randomly generated by the LAA device or configured by another device for the LAA device, and N is a natural number with a predetermined maximum value. The specific generation method of N will be described below.

Step A: the LAA device performs a CCA/eCCA (a CCA or an eCCA). If the result of the assessment is 'busy', the LAA device implements the next CCA/eCCA (executes Step A repeatedly), if the result of the assessment is 'idle', the LAA device performs a decrement operation on the N (e.g. set N=N−1).

Step B: the LAA device determines whether or not N is greater than 0, if the result of the determination is 'No' (that is, N=0), the LAA device uses an unlicensed carrier for transmission (that is, it is considered that the LAA device successfully obtains a right for using an unlicensed carrier by performing the CCA/eCCA), and if the result of the determination is 'Yes', the LAA device executes Step A repeatedly.

The optional embodiment is described below in detail based on an application scenario thereof, and if the fairness for a wifi system in contention is taken into consideration in the optional embodiment (if no fairness is taken into consideration, then the lower limit value of N is set to be 0), then the step that the LAA device acquires a numerical value N specifically includes that: N is defined to be a natural number. The LAA device randomly generates a numerical value N every time the LAA device competes for a right for using an unlicensed carrier for data transmission, and regenerates a value of N in the next time the LAA device competes for a right for using an unlicensed carrier after successfully obtaining the right for using an unlicensed carrier. In a wifi system, an AP/SPT needs to perform a CCA to acquire an unlicensed carrier, as the duration of the CCA is equal to that of a Distributed Inter-Frame Spacing (DIFS) (about 34 μs), to compete with a wifi system fairly, the lower limit of N is set to be close to: a plurality of positive integers around the quotient of the duration of the DIFS and that of a single CCA or an eCCA (that is, 3 smaller positive integers and 3 greater positive integers around the quotient, 3 is an empirical value but not to be construed as a limitation). For example, assume that the duration of a single CCA/eCCA is 18 μs, then the quotient of 34 and 18 is approximately equal to 1.89, thus, the positive integers around 1.89 include: 1, 2, 3 and 4 (−1 and 0 are excluded because they are not positive integers), and generally, the positive integer most close to 1.89, for example, 2, or a value secondarily close to 1.89, for example, 1, is selected. For another example, assume that the duration of a single CCA/eCCA is 9 μs, the quotient of 34 and 9 is approximately equal to 3.78, thus, the positive integers around 3.78 includes 1, 2, 4, 5 and 6. Generally, the value most close to 3.78, for example, 4, or the value secondarily close to 3.78, for example, 3, is selected. For a specific system, the lower limit of N is usually preset (for example, a specific value is appointed, or acquired in the foregoing way). Generally, the upper limit of N is a predetermined value which can be dynamically changed to adapt to different scenarios. For example, in view of the great number of LAA device data in an LAA device system, N is defined to be relatively large so that there are fewer conflicts (that is, the generation of the same numerical value N by LAA devices) in a larger range. A preferred upper limit of N is given below according to the frame structure of LTE and the definition of an OFDM symbol. The value obtained by rounding down the quotient of the duration of the first three or four OFDM symbols (including CP) in an LTE sub-frame and a defined CCA duration (for example, 9 μs, 18 μs or 20 μs) is taken as the upper limit of the N. Alternatively, the value obtained by rounding down the quotient of the duration of the last three or four OFDM symbols (including CP) in an LTE sub-frame and a defined CCA duration (for example, 9 μs, 18 μs or 20 μs) is taken as the upper limit of the N. An eCCA consists of a plurality of CCAs. For example, an eCCA procedure includes the implementation of N times CCA.

Step A: an LAA device performs a CCA/eCCA. If the result of the assessment is 'busy', the LAA device implements the next CCA/eCCA (executes Step A repeatedly), if the result of the assessment is 'idle', the LAA device performs a decrement operation on N (e.g. set N=N−1). Step A is preferably executed as follows: if the result of the assessment is 'busy', the LAA device performs the next CCA/eCCA. Specifically, the LAA device continues to perform the next CCA/eCCA at the moment the former CCA/eCCA ends, or the LAA device waits to perform the next CCA/eCCA until the next CCA/eCCA implementation period (cycle) comes, the LAA device performing no CCA/eCCA before the period or cycle comes. If the lower limit of the N is set as described above, the LAA device adopts the detection manner of performing the next CCA/eCCA at the moment the former CCA/eCCA ends, for example, if the lower limit of the N is set to be 4, then when N is 4 and during the process of progressively decrementing N to 0, the LAA device needs to perform a CCA/eCCA right after the former CCA/eCCA ends. In a case where N is another numerical value, the LAA device cannot perform the next CCA/eCCA successively until N is decremented to 4, or the LAA device waits to perform the next CCA/eCCA until an implementation period comes.

If the result of assessment is 'idle', the LAA device performs a decrement operation (for example, set N=N−1) on the N, the decrement magnitude may be greater than or equal to 1, for example, 2, that is, N=N−2. Alternatively, the decrement magnitude is a dynamically adjustable value, for example, when the data the LAA device plans to send has a relatively high priority, the decrement magnitude can be relatively large, for example, N=N−4. In this way, the LAA device can obtain a right for using an unlicensed carrier with a high probability. Alternatively, if an LAA device fails successively to obtain a right for using an unlicensed carrier for many times (the times should be appointed in advance), the station can adjust the decrement magnitude.

Step B: the LAA device determines whether or not N is greater than 0. If the result of the determination is 'No' (that is, N=0), the LAA device uses an unlicensed carrier for transmission (that is, it is considered that the LAA device successfully obtains a right for using an unlicensed carrier by performing the CCA/eCCA), and if the result of the determination is 'Yes', the LAA device executes Step A repeatedly. Step B is preferably executed as follows: if the result of the determination is 'yes', the LAA device executes Step A repeatedly. Specifically, Step B further comprises that: the generation of a new numerical value N is allowed before the LAA device executes Step A repeatedly, wherein the new numerical value N ranges from 0 to the current N of the LAA device. Alternatively, the generation of a new numerical value N is allowed after the LAA device executes Step A for a plurality of times (the specific times needs to be appointed in advance), wherein the new numerical value N ranges from 0 to the current N of the LAA device. In this way, the resource waste caused by an overlong CCA/eCCA implementation process is avoided to some degree.

Embodiment 2

Figure 10:
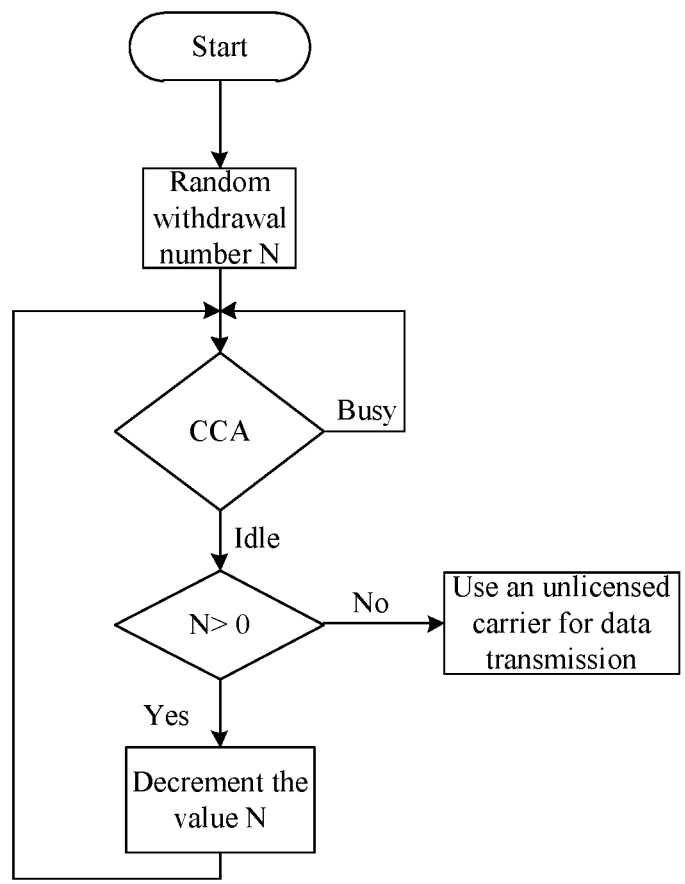
FIG. 10 is a schematic diagram 2 of an unlicensed carrier contention method according to an optional embodiment of the disclosure.

Corresponding to Mode 2 of the optional embodiment, FIG. 10 is a schematic diagram 2 illustrating an unlicensed carrier contention method according to an optional embodiment of the disclosure. As shown in FIG. 10, Embodiment 2 is similar to Embodiment 1, except that the sequence of the step of determining whether or not the N is greater than 0 and the step of performing a decrement operation on the N is reversed in Embodiment 2, and thus the details of the specific implementation of Embodiment 1 are still applicable to Embodiment 2. Embodiment 2 is also a performable eCCA procedure, and compared with Embodiment 1, an LAA device needs to perform one more CCA in the case of the same N.

An LAA device (any device that uses an unlicensed carrier, for example, a base station, a small cell, a homeNB, a UE) obtains a right for using an unlicensed carrier by performing a CCA and/or an eCCA according to the following procedure.

The LAA device acquires a numerical value N (the numerical value N may be randomly generated by the LAA device or configured by another device for the LAA device), wherein N is a natural number whose maximum value is predetermined. The specific generation method of N will be described below.

Step 1: an LAA device implements a CCA/eCCA. The LAA device implements the next CCA/eCCA (executes Step 1 repeatedly) if the result of the assessment is 'busy', or determines whether or not the N is greater than 0 if the result of the assessment is 'idle'. If the result of the determination is 'No' (that is, N=0), the LAA device uses an unlicensed carrier for transmission (that is, it is considered that the LAA device successfully obtains a right for using an unlicensed carrier by performing the CCA/eCCA), and if the result of the determination is 'Yes', the LAA device executes Step 2.

Step 2: the LAA device performs a decrement operation (for example, set N=N−1) on N and synchronously returns to execute Step 1.

A representative of the optimal implementation mode of the optional embodiment (optimal implementation modes of the optional embodiment include, but are not limited to, the following implementation mode) is described below, and the fairness for a wifi system in contention is taken into consideration (the lower limit of N is set to be 0 if the fairness for a wifi system is not taken into consideration) in the embodiment.

The step that the LAA device acquires a numerical value N specifically includes: the N is defined to be a natural number. The LAA device randomly generates a numerical value N every time the LAA device competes for a right for using an unlicensed carrier for data transmission, and regenerates a value of N in the next time the LAA device competes for a right for using an unlicensed carrier after successfully obtaining the right for using an unlicensed carrier. In a wifi system, an AP/STA needs to perform a CCA when acquiring an unlicensed carrier, the duration of the CCA is equal to that of a DIFS (about 34 μs), to compete with a wifi system fairly, the lower limit of N is set to be close to a plurality of positive integers around the quotient of the duration of the DIFS and that of a single CCA or an eCCA (that is, 3 smaller positive integers and 3 greater positive integers around the quotient, 3 is an empirical value but not to be construed as a limitation).

When compared with in Embodiment 1, the lower limit of a numerical value N in Embodiment 2 is set substantially in the same way, however, in Embodiment 2, the lower limit of N is set by decrementing the lower limit of a numerical value N obtained in Embodiment 1 by 1. In Embodiment 2, the upper limit of a numerical value N is set by decrementing the lower limit of a numerical value N obtained in Embodiment 1 by 1.

Below is a preferred scheme of Step A: if the result of the assessment is 'busy', the LAA device performs the next CCA/eCCA. Specifically, the LAA device continues to perform the next CCA/eCCA at the moment the former CCA/eCCA ends, or the LAA device waits to perform the next CCA/eCCA until the next CCA/eCCA implementation period (cycle) comes, the LAA device performing no CCA/eCCA before the period or cycle comes. If the lower limit of a numerical value N is set as described above, the LAA device performs the next CCA/eCCA right after the former CCA/eCCA ends, for example, if the lower limit of N is set to be 3, then when N=3 and during the process the N is decremented to 0, the LAA device needs to performs the next CCA/eCCA right after the former CCA/eCCA ends. In a case where N is another numerical value, the LAA device cannot perform the next CCA/eCCA unless N is decremented to 4, or the LAA device waits to perform the next CCA/eCCA until an implementation period comes.

The LAA device determines whether or not N is greater than 0. If the result of the determination is 'No' (that is, N=0), the LAA device uses an unlicensed carrier for transmission (that is, it is considered that the LAA device successfully obtains a right for using an unlicensed carrier by performing the CCA/eCCA), and if the result of the determination is 'Yes', the LAA device executes Step 2 repeatedly. Step 1 is preferably executed as follows: if the result of the determination is 'yes', the LAA device executes 2 repeatedly. Specifically, this step further comprises that the generation of a new numerical value N is allowed before the LAA device executes Step 2 repeatedly, wherein the new numerical value N ranges from 0 to the current N of the LAA device. Alternatively, the generation of a new numerical value N is allowed after the LAA device executes Step A for a plurality of times (the specific times needs to be appointed in advance), wherein the new numerical value N ranges from 0 to the current N of the LAA device. In this way, the resource waste caused by an overlong CCA/eCCA implementation process is avoided to some degree.

Below is a preferred scheme of Step 2: the LAA device performs a decrement operation (for example, set N=N−1) on N and synchronously returns to execute Step 1. The specific decrement magnitude may be greater than or equal to 1, for example, 2, that is, N=N−2. Alternatively, the decrement magnitude is a dynamically adjustable value, for example, when the data the LAA device plans to send has a relatively high priority, the decrement magnitude can be relatively large, for example, N=N−4. In this way, the LAA device can obtain a right for using an unlicensed carrier with a high probability. Alternatively, if an LAA device fails successively to obtain a right for using an unlicensed carrier for many times (the times should be appointed in advance), the station can adjust the decrement magnitude.

Based on FIG. 10, an unlicensed carrier contention method is provided in an optional embodiment, including: an LAA device first performs a CCA on a channel, and after sensing the channel is idle during the CCA, the LAA device continues to execute the following steps:

S1: if N>0, the LAA device decrements N and sets N=N−1, wherein N is a nonnegative integer;

S2: the LAA device senses the channel through the CCA, executes S3 if the channel is sensed to be idle, otherwise executes S4;

S3: the LAA device uses an unlicensed data for data transmission if N=0, or executes S1;

S4: the LAA device senses the channel through the CCA; and

S5: the LAA device executes S1 or S3 if the channel is sensed to be idle, or executes S4.

It should be noted that prior to S1, the method of the optional embodiment further comprises that: the LAA device randomly generates a random withdrawal number N.

Besides, the CCA involved in the optional embodiment includes at least one of: an initial CCA and an eCCA. Based on this, the CCA implemented by the LAA device in S2 is one CCA of an eCCA, and the CCA the LAA device continues to implement in S4 is the same as the CCA initially implemented by the LAA device, both being initial CCAs.

Based on the foregoing unlicensed carrier contention method, an unlicensed carrier contention apparatus applied to the side of an LAA device is also provided, including: a first detection module arranged to implement a CCA on a channel first, and after sensing the channel is idle during the CCA, the apparatus functions through the following modules: a first determination module configured for the LAA device to decrement N and set N=N−1 if N>0, wherein N is a nonnegative integer; S2: a first processing module arranged to sense the channel through the CCA, function through a transmission module if the channel is sensed to be idle, or function through a second detection module; the transmission module configured for the LAA device to uses an unlicensed carrier for data transmission if N=0, otherwise, the first detection module functions; the second detection module configured for the LAA device to sense the channel through the CCA; and a first triggering module arranged to activate the first detection module or the processing module if the channel is sensed to be idle or activate the second detection module.

Optionally, before a CCA is performed, the apparatus further comprises: a first generation module arranged to generate the N randomly.

Besides, based on FIG. 10, another unlicensed carrier contention method is provided in an optional embodiment, including: an LAA device first performs a CCA on a channel, and after sensing the channel is idle during the CCA, the LAA device continues to execute the following steps:

S1: the LAA device executes S4;

S2: if N>0, the LAA device decrements N and sets N=N−1, wherein N is a nonnegative integer;

S3: the LAA device senses the channel through the CCA, executes S4 if the channel is sensed to be idle, or executes S5;

S4: the LAA device uses an unlicensed data for data transmission if N=0, or executes S2;

S5: the LAA device senses the channel through the CCA; and

S6: the LAA device executes S2 or S3 if the channel is sensed to be idle, or executes S5.

It should be noted that prior to S1, the method further comprises the following step that: the LAA device randomly generates a random withdrawal number N.

Besides, the CCA involved in steps S1-S6 includes at least one of: an initial CCA and an eCCA. Based on this, the CCA performed by the LAA device in S3 is one CCA of an eCCA, and the CCA the LAA device continues to implement in S5 is the same as the CCA detection initially performed by the LAA device, both being initial CCAs.

Based on the method consisting of the foregoing steps S1-S6, an unlicensed carrier contention apparatus is provided, applied to an LAA device side and including: a third detection module arranged to implement a CCA on a channel first, and after sensing the channel is idle during the CCA, the apparatus continues to function through the following modules: a second triggering module arranged to activate a second processing module; a second determination module arranged to decrement N and set N=N−1 if N>0, wherein N is a nonnegative integer; a third detection module arranged to sense the channel through the CCA and activate the second processing module if the channel is sensed to be idle or activate a fourth detection module; the second processing module arranged for the LAA device to use an unlicensed carrier for data transmission if N=0, or activate the second determination module; a fourth detection module arranged to sense the channel through the CCA; and a third triggering module arranged to activate the second triggering module or the second processing module if the channel is sensed to be idle or activate the fourth detection function.

Optionally, before the second triggering module functions, the apparatus further comprises: a second generation module arranged to randomly generate a random withdrawal number N.

It should be noted that in the optional embodiment, the foregoing N being a nonnegative integer means N being an integer greater than or equal to 0.

Embodiment 3

Figure 11:
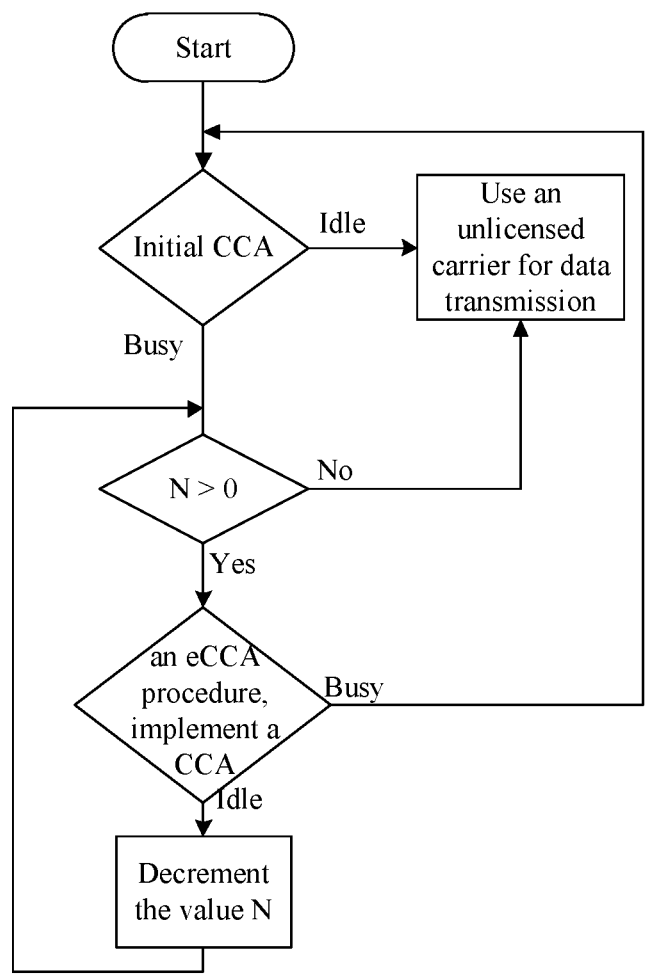
FIG. 11 is a schematic diagram 3 of an unlicensed carrier contention method according to an optional embodiment of the disclosure.

Corresponding to Mode 3 of the optional embodiment, FIG. 11 is a flowchart 3 illustrating an unlicensed carrier contention method according to an optional embodiment of the disclosure. As shown in FIG. 11, the method includes the following steps:

an LAA device acquires a numerical value N before performing a CCA/an eCCA, wherein the numerical value N is defined and acquired as described in Embodiment 1 or defined as described in Embodiment 2.

The LAA device performs an initial CCA, uses an unlicensed carrier for data transmission if the result of the CCA is 'idle', or the LAA device determines whether or not N is greater than 0 if the result of the CCA is 'busy'. If the result of the determination is that N is not greater than 0, the LAA device uses an unlicensed carrier for data transmission, and if the result of the determination is that the N is greater than 0, the LAA device performs a CCA (enters an eCCA procedure including the implementation of many times CCAs); if the result of the assessment is 'idle', then the LAA device performs a decrement operation (e.g. set N=N−1) on the N and synchronously returns to the entry of determining whether or not the N is greater than 0; and if the result of the assessment is 'busy', the LAA device returns to the entry of implementing the initial CCA. The duration of the initial CCA may be different from that of a single CCA of the eCCA procedure.

Optionally, the N may be decremented in the way described in Embodiment 1 or 2.

Optionally, it is defined that the lower limit of the N is 0 and the upper limit of the N is defined as described in Embodiment 1 or 2.

The returning of the LAA device to the entry of implementing the initial CCA is specifically as follows: the LAA device performs the next initial CCA immediately or waits to perform the next initial CCA until the next initial CCA implementation period comes. After proceeding to an eCCA procedure, the LAA device performs the next CCA successively if the LAA device is in a CCA/eCCA implementation period. The LAA device may perform no CCA in a non-CCA/eCCA period.

N may be decremented as described in Embodiment 1 or 2.

Embodiment 4

Figure 12:
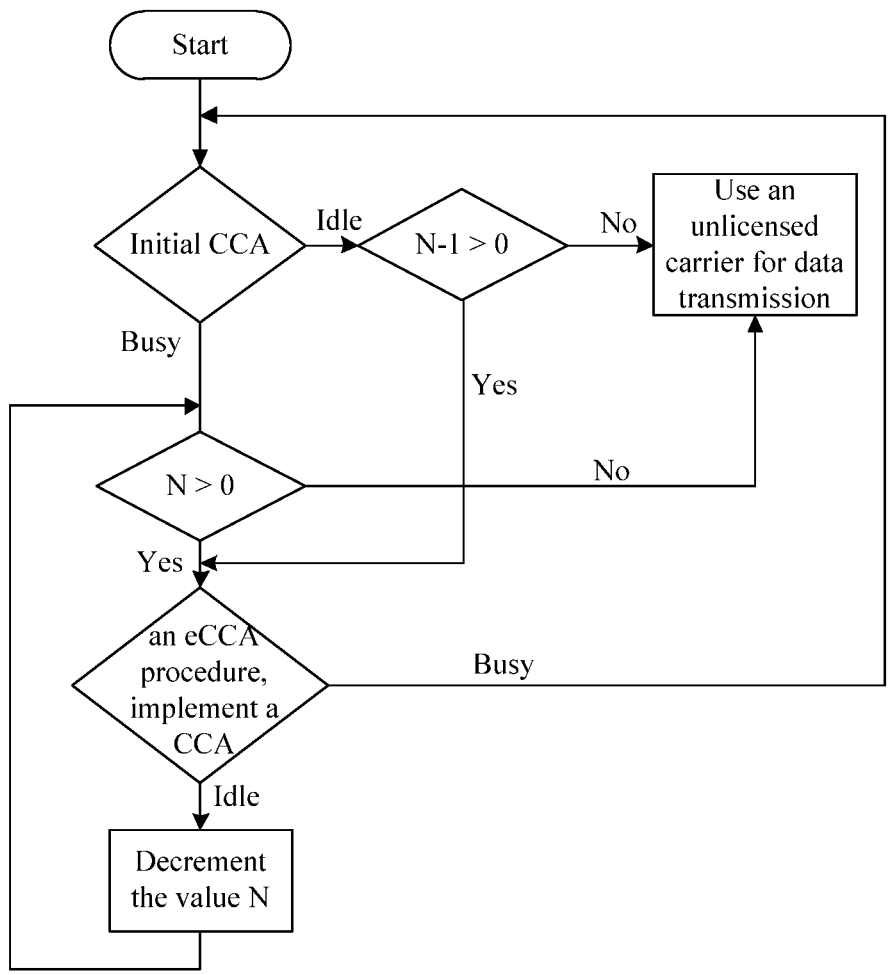
FIG. 12 is a schematic diagram 4 of an unlicensed carrier contention method according to an optional embodiment of the disclosure.

Corresponding to Mode 4 of the optional embodiment, FIG. 12 is a flowchart 4 illustrating an unlicensed carrier contention method according to an optional embodiment of the disclosure. As shown in FIG. 12, the method includes the following steps:

an LAA device acquires a numerical value N before performing a CCA/an eCCA, wherein N is defined and acquired as described in Embodiment 1 or defined as described in Embodiment 2.

The LAA device performs an initial CCA, if the result of the CCA is 'idle', the LAA device determines whether or not N−1 is greater than 0, if the result of the determination is that N−1 is not greater than 0, the LAA device uses an unlicensed carrier for data transmission, otherwise, the LAA device implements a CCA (enters an eCCA procedure); if the result of the CAA is 'busy', then the LAA device determines whether or not N is greater than 0, if the result of the determination is that N is not greater than 0, the LAA device uses an unlicensed carrier for data transmission, if the result of the determination is that the N is greater than 0, the LAA device performs a CCA (enters an eCCA procedure including the implementation of many times CCA), if the result of the assessment is 'idle', the LAA device performs a decrement operation (e.g. set N=N−1) on the N and synchronously returns to the entry of determining whether or not the N is greater than 0; and if the result of the assessment is 'busy', the LAA device returns to the entry of implementing the initial CCA.

Optionally, the N may be decremented in the way described in Embodiment 1 or 2.

Optionally, the lower limit of the N is defined to be 0, and the upper limit of the N is defined as described in Embodiment 1 or 2.

The returning of the LAA device to the entry of implementing the initial CCA is specifically as follows: the LAA device implements the next initial CCA immediately or waits to perform the next initial CCA until the next initial CCA implementation period comes. After proceeding to an eCCA procedure, the LAA device performs the next CCA successively if the LAA device is in a CCA/eCCA implementation period. The LAA device m ay perform no CCA in a non-CCA/eCCA period.

The N may be decremented as described in Embodiment 1 or 2.

Embodiment 5

Figure 13:
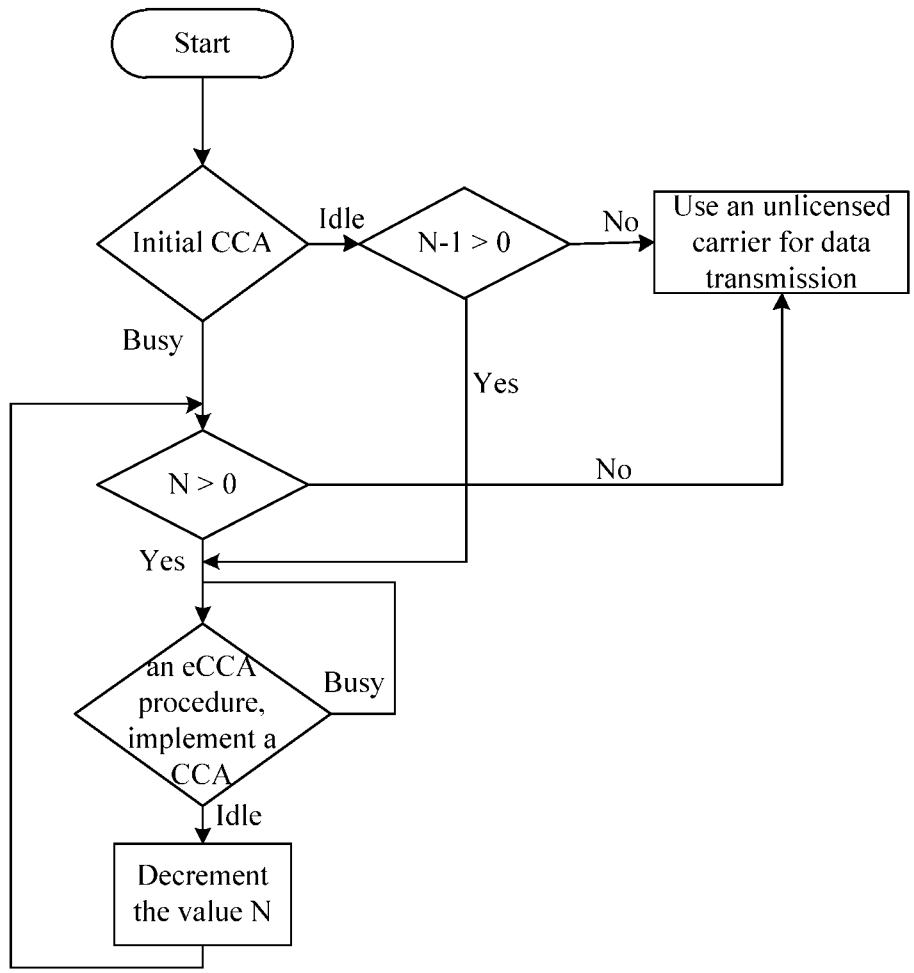
FIG. 13 is a schematic diagram 5 of an unlicensed carrier contention method according to an optional embodiment of the disclosure.

It should be noted that Embodiment 5 is similar to Embodiment 4, FIG. 13 is a flowchart 5 illustrating an unlicensed carrier contention method according to an optional embodiment of the disclosure. As shown in FIG. 13, the method includes the following steps:

an LAA device acquires a numerical value N before performing a CCA/an eCCA, wherein N is defined and acquired as described in Embodiment 1 or defined as described in Embodiment 2.

The LAA device performs an initial CCA, if the result of the CCA is 'idle', the LAA device determines whether or not N−1 is greater than 0, if the result of the determination is that N−1 is not greater than 0, the LAA device uses an unlicensed carrier for data transmission, otherwise, the LAA device implements a CCA (enters an eCCA procedure); if the result of the CCA is 'busy', then the LAA device determines whether or not N is greater than 0, if the result of the determination is that N is not greater than 0, the LAA device uses an unlicensed carrier for data transmission, if the result of the determination is that N is greater than 0, the LAA device implements a CCA (enters an eCCA procedure including the implementation of many times CCA), if the result of the assessment is 'idle', the LAA device performs a decrement operation (e.g. set N=N−1) on the N and synchronously returns to the entry of determining whether or not the N is greater than 0; and if the result of the assessment is 'busy', the LAA device continues to perform the next CCA of the eCCA.

Optionally, the N may be decremented in the way described in Embodiment 1 or 2.

Optionally, the lower limit of N is defined to be 0, and the upper limit of N is defined as described in Embodiment 1 or 2.

The N may be decremented as described in Embodiment 1 or 2.

It can be known from above that an implementation procedure is provided herein according to which an LAA device can obtain a right for using an unlicensed carrier and which is supportive to the fair contention among LAA devices, especially between an LAA device and a wifi device.

In still another embodiment, a memory medium is provided which includes, but is not limited to: an optical disk, a floppy disk, a hard disk and an erasable memory and on which the foregoing software is stored.

Apparently, it should be appreciated by those skilled in the art that each module or step described in the disclosure can be realized by a universal computer and that the modules or steps may be integrated on a single computer or distributed on a network consisting of a plurality of computers, optionally, the modules or steps may be realized by executable program codes so that the modules or steps can be stored in a memory to be executed by a computer, and in some cases, the steps shown or described herein can be executed in a sequence different from this presented herein, or the modules or steps are formed into integrated circuit modules, or several of the modules or steps are formed into integrated circuit modules. Therefore, the disclosure is not limited to the combination of specific hardware and software.

Although certain preferred embodiments of the disclosure have been described above, it should be appreciated that the preferred embodiments are not described for limiting the disclosure and that a variety of modifications and variations can be devised by those of ordinary skill in the art. Any modification, equivalent substitute and improvement that can be devised by those of ordinary skill in the art without departing from the spirit of the disclosure and that the modifications and improvements shall fall within the protection scope of the disclosure.

INDUSTRIAL APPLICABILITY

In embodiments of the disclosure, an LAA device performs a CCA or an eCCA, if the result of the assessment is 'idle', the LAA device performs a decrement operation on N and determines whether or not the decremented N is greater than 0, wherein N is a natural number; and if the result of the determination indicates that the decremented N is not greater than 0, the LAA device uses an unlicensed carrier for data transmission, thus addressing the problem that no contention withdrawal mechanism and procedure suitable for an LAA system is provided in the conventional art, and avoiding the interference resulted from the synchronous use of unlicensed carriers by neighboring transmission nodes of the same system.

The invention claimed is:

1. An unlicensed carrier contention method, comprising: performing, by a Licensed Assisted Access (LAA) device, a Clear Channel Assessment (CCA) on a channel, and after sensing the channel is idle during the CCA, proceeding to execute the following operations:
S1: if a random withdrawal number N>0, decrementing, by the LAA device, N by one, wherein N is randomly generated by the LAA device or configured by another device and is a nonnegative integer;
S2: sensing, by the LAA device, the channel through the CCA and executing S3 if the channel is sensed to be idle, otherwise executing S4;
S3: if N=0, using, by the LAA device, an unlicensed carrier for data transmission, otherwise executing S1;
S4: sensing, by the LAA device, the channel through the CCA; and
S5: if the channel is sensed to be idle, executing S1 or S3 by the LAA device, otherwise executing S4 by the LAA device,
wherein the CCA performed by the LAA device in S2 is one CCA of an extended Clear Channel Assessment (eCCA), and
wherein the CCA performed by the LAA device in S4 is the same as the CCA initially performed by the LAA device, both being initial CCAs.

2. The method according to claim 1, wherein the CCA includes at least one of: an initial CCA or the eCCA.

3. An unlicensed carrier contention apparatus, applied to a Licensed Assisted Access (LAA) device side and comprising:
a memory for storing computer-readable instructions;
a processor executing the computer-executable instructions to implement a plurality of program modules, wherein the plurality of program modules comprises: a first detection module, a first determination module, a first processing module, a transmission module, a second detection module, a first triggering module and a first generation module,
wherein the first detection module is configured to perform a Clear Channel Assessment (CCA) on a channel, and after sensing the channel is idle during the CCA, the apparatus functions through the following modules:
the first determination module configured to decrement a random withdrawal number N by one if N>0, wherein N is randomly generated by the first generation module of the LAA device or configured by another device and is a nonnegative integer;
the first processing module configured to sense the channel through the CCA, and function through the transmission module if the channel is sensed to be idle, otherwise function through the second detection module;
the transmission module configured to use an unlicensed carrier for data transmission if N=0, otherwise function through the first detection module;
the second detection module configured to sense the channel through the CCA; and
the first triggering module configured to activate the first detection module or the processing module if the channel is sensed to be idle, otherwise activate the second detection module,
wherein the CCA performed in the first processing module is one CCA of an extended Clear Channel Assessment (eCCA),
wherein the CCA performed in the second detection module is an initial CCA, and
wherein the CCA performed in the first detection module is the initial CCA.

4. The apparatus according to claim 3, wherein the CCA includes at least one of: the initial CCA or the eCCA.

5. An unlicensed carrier contention method, comprising: performing, by a Licensed Assisted Access (LAA) device, a Clear Channel Assessment (CCA) on a channel, and after sensing the channel is idle during the CCA, executing, by the LAA device, the following operations:
S1: executing S4 by the LAA device;
S2: if a random withdrawal number N>0, decrementing, by the LAA device, N by one, wherein N is randomly generated by the LAA device or configured by another device and is a nonnegative integer;
S3: sensing, by the LAA device, the channel through the CCA, and executing S4 if the channel is sensed to be idle, otherwise executing S5;
S4: if N=0, using, by the LAA device, an unlicensed carrier for data transmission, otherwise executing S2;
S5: sensing, by the LAA device, the channel through the CCA; and
S6: if the channel is sensed to be idle, executing S2 or S4 by the LAA device, otherwise executing S5 by the LAA device,
wherein the CCA performed by the LAA device in S3 is one CCA of an extended Clear Channel Assessment, eCCA, and
wherein the CCA performed by the LAA device in S5 is the same as the CCA initially performed by the LAA device, both being initial CCAs.

6. The method according to claim 5, wherein the CCA includes at least one of: the initial CCA or the eCCA.

7. An unlicensed carrier contention apparatus, applied to a Licensed Assisted Access (LAA) device side and comprising:
a memory for storing computer-readable instructions;
a processor executing the computer-executable instructions to implement a plurality of program modules, wherein the plurality of program modules comprises: a third detection module, a second triggering module, a second determination module, a second processing module, a fourth detection module, a third triggering module and a second generation module,
wherein the third detection module is configured to perform a Clear Channel Assessment (CCA) on a channel, and after sensing the channel is idle during the CCA, the apparatus continues to function through the following modules:
the second triggering module configured to activate the second processing module;

the second determination module configured to decrement a random withdrawal number N by one if N>0, wherein N is randomly generated by the second generation module of the LAA device or configured by another device and is a nonnegative integer;

the third detection module configured to sense the channel through the CCA and activate the second processing module if the channel is sensed to be idle, otherwise activate the fourth detection module;

the second processing module configured to use an unlicensed carrier for data transmission if N=0, otherwise activate the second determination module;

the fourth detection module configured to sense the channel through the CCA; and the third triggering module configured to activate the second triggering module or the second processing module if the channel is sensed to be idle, otherwise activate the fourth detection function, wherein the CCA performed in the third detection module is one CCA of an extended Clear Channel Assessment (eCCA), and wherein the CCA performed in the fourth detection module is the same as the CCA initially performed by the third detection module, both being initial CCAs.

8. The apparatus according to claim 7, wherein the CCA includes at least one of: the initial CCA or the eCCA.

* * * * *